United States Patent
Medoff

(10) Patent No.: US 9,175,443 B2
(45) Date of Patent: *Nov. 3, 2015

(54) FUNCTIONALIZING CELLULOSIC AND LIGNOCELLULOSIC MATERIALS

(71) Applicant: XYLECO, INC., Woburn, MA (US)

(72) Inventor: Marshall Medoff, Brookline, MA (US)

(73) Assignee: XYLECO, INC., Woburn, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/694,219

(22) Filed: Apr. 23, 2015

(65) Prior Publication Data

US 2015/0225902 A1    Aug. 13, 2015

Related U.S. Application Data

(63) Continuation of application No. 14/150,649, filed on Jan. 8, 2014, now Pat. No. 9,062,413, which is a continuation of application No. 13/546,570, filed on Jul. 11, 2012, now Pat. No. 8,641,864, which is a continuation of application No. 13/009,412, filed on Jan. 19, 2011, now Pat. No. 8,221,585, which is a continuation of application No. 12/417,904, filed on Apr. 3, 2009, now Pat. No. 7,867,359.

(60) Provisional application No. 61/049,391, filed on Apr. 30, 2008, provisional application No. 61/049,394, filed on Apr. 30, 2008, provisional application No. 61/049,395, filed on Apr. 30, 2008, provisional application No. 61/073,432, filed on Jun. 18, 2008, provisional application No. 61/073,436, filed on Jun. 18, 2008.

(51) Int. Cl.
| | |
|---|---|
| *D21C 5/00* | (2006.01) |
| *D21H 25/04* | (2006.01) |
| *C08B 15/02* | (2006.01) |
| *C08H 8/00* | (2010.01) |
| *D21C 9/00* | (2006.01) |
| *D21C 1/00* | (2006.01) |
| *D21H 11/04* | (2006.01) |
| *D21H 11/16* | (2006.01) |

(52) U.S. Cl.
CPC ............... *D21H 25/04* (2013.01); *C08B 15/02* (2013.01); *C08H 8/00* (2013.01); *D21C 1/00* (2013.01); *D21C 9/007* (2013.01); *D21H 11/04* (2013.01); *D21H 11/16* (2013.01)

(58) Field of Classification Search
USPC .................. 162/60, 158, 192; 204/157.63
See application file for complete search history.

(56) References Cited

U.S. PATENT DOCUMENTS

| | | | |
|---|---|---|---|
| 3,352,773 A | 11/1967 | Schwartz et al. | |
| 3,455,853 A | 7/1969 | Dekking | |

(Continued)

FOREIGN PATENT DOCUMENTS

| | | |
|---|---|---|
| WO | 0034958 | 6/2000 |
| WO | 2004044325 | 5/2004 |

OTHER PUBLICATIONS

Usmanov and Vakhidov, Change in certain properties of cellulose during y-irradiation and storage, 1980, Polymer science USSR, vol. 22, issue 1, pp. 87-93.

Dziedziela et al., "Functional Groups in Gamma-Irradiated Cellulose", Radiation Physics and Chemistry, 1984, vol. 23 (6), pp. 723-725.

Bouchard et al., "The Effects of Ionizing Radiation on the Cellulose of Wood Free Paper", Cellulose, 2006, vol. 13, pp. 601-610.

Takacs et al., "Effect of Gamma-Irradiation on Cotton-Cellulose", Radiation Physics and Chemistry, 1999, vol. 55, pp. 663-666.

Jianqin et al., "Pre-irradiation Grafting of Temperature Sensitive Hydrogel on Cotton Cellulose Fabric," Radiation Physics and Chemistry, 1999, vol. 55, pp. 55-59.

(Continued)

*Primary Examiner* — Jacob Thomas Minskey
(74) *Attorney, Agent, or Firm* — Leber Patent Law P.C.

(57) ABSTRACT

Irradiated lignocellulosic or cellulosic materials are provided which contain carboxylic acid groups and/or other functional groups not present in a naturally occurring cellulosic or lignocellulosic material from which the irradiated material was obtained.

22 Claims, 19 Drawing Sheets

(56) References Cited

U.S. PATENT DOCUMENTS

| | | |
|---|---|---|
| 3,549,509 A | 12/1970 | Casalina |
| 3,549,510 A | 12/1970 | Casalina |
| 3,726,756 A | 4/1973 | Polak |
| 3,779,706 A | 12/1973 | Nablo |
| 3,801,432 A | 4/1974 | Free |
| 3,912,837 A | 10/1975 | Pesek et al. |
| 3,962,054 A | 6/1976 | Wattiez et al. |
| 4,091,167 A | 5/1978 | Okada et al. |
| 4,486,585 A | 12/1984 | Turunen et al. |
| 4,576,609 A | 3/1986 | Hageman et al. |
| 4,660,859 A | 4/1987 | Natesh |
| 4,769,082 A | 9/1988 | Kumakura et al. |
| 6,057,033 A | 5/2000 | Bilodeau |
| 6,264,791 B1 | 7/2001 | Sun et al. |
| 6,808,600 B2 | 10/2004 | Ross et al. |
| 6,882,095 B2 | 4/2005 | Avnery |
| 6,933,514 B2 | 8/2005 | Rhodes |
| 7,026,635 B2 | 4/2006 | Rangwalla et al. |
| 7,267,744 B2 | 9/2007 | Graveson et al. |
| 7,300,705 B2 | 11/2007 | Neogi et al. |
| 8,668,807 B2 | 3/2014 | Rahman et al. |
| 2002/0064495 A1 | 5/2002 | Miura et al. |
| 2002/0160270 A1 | 10/2002 | Bronstert et al. |
| 2004/0086662 A1 | 5/2004 | Callegari et al. |
| 2007/0184196 A1 | 8/2007 | Wallace et al. |
| 2007/0246176 A1 | 10/2007 | Miyawaki et al. |
| 2008/0251156 A1 | 10/2008 | Kang et al. |
| 2009/0011473 A1 | 1/2009 | Varanasi et al. |

OTHER PUBLICATIONS

Mazzei et al., "Radiation Grafting Studies of Acrylic Acid onto Cellulose Triacetate Membranes," Radiation Physics and Chemistry, 2002, vol. 64, pp. 149-160.
Stepanik et al., "Electron Treatment of Wood Pulp for the Viscone Process," Radiation Physics and Chemistry 57 (2000) 377-379.
International Search Report/Written Opinion for PCT/US2009/041881, KIPO, mailed Dec. 22, 2009.
Wach et al., "Radiation Crosslinking of Carboxymethylcellulose of Various Degree of Substitution at High Concentration in Aqueous Solution of Natural pH," Radiation Physics and Chemistry, 2003, vol. 68, pp. 771-779.
Saeman et al., "Effect of High-Energy Cathode Rays on Cellulose," Industrial and Engineering Chemistry, 1952, vol. 44 (12), pp. 2848-2852.
Iller et al., "Electron-Beam Stimulation of the Reactivity of Cellulose Pulps for Production of Derivatives," Radiation Physics and Chemistry 63, (2002) 253-257.
Kato et al., "Surface Oxidation of Cellulose Fibers by Vacuum Ultraviolet Radiation," Journal of Polymer Science: Part A: Polymer Chemistry, vol. 37, 357-361 (1999).
Mares et al., "Radiation Initiated Crosslinking of Cellulose," Polymer Letters, vol. 7, pp. 419-425 (1969).
Pan et al., "The Influence of High Energy Radiation on Cotton," Textile Research Journal, May 1959, pp. 415-421.

FIG. 6L

FUNCTIONALIZING CELLULOSIC AND LIGNOCELLULOSIC MATERIALS

RELATED APPLICATIONS

This application is a continuation of U.S. application Ser. No. 14/150,649, filed Jan. 8, 2014, which is a continuation of U.S. application Ser. No. 13/546,570, filed Jun. 11, 2012, now U.S. Pat. No. 8,641,864, which is a continuation of U.S. application Ser. No. 13/009,412, filed Jan. 19, 2011, now U.S. Pat. No. 8,221,585, which is in turn a continuation of U.S. application Ser. No. 12/417,904, filed Apr. 3, 2009, now U.S. Pat. No. 7,867,359, which claims the benefit of U.S. Provisional Application Nos. 61/049,391, filed Apr. 30, 2008, 61/049,394, filed Apr. 30, 2008, 61/049,395, filed Apr. 30, 2008, 61/073,432, filed Jun. 18, 2008, and 61/073,436, filed Jun. 18, 2008. The entire disclosure of each of the above-referenced applications is incorporated herein by reference.

TECHNICAL FIELD

This invention relates to methods of functionalizing cellulosic and lignocellulosic materials, e.g., with carboxylic acid groups, and the resulting functionalized materials.

BACKGROUND

Cellulosic and lignocellulosic materials, such as papers, wood products, and cellulosic textiles, generally contain relatively few carboxylic acid groups.

SUMMARY

The invention is based, in part, on the discovery that by irradiating fibrous materials at appropriate levels, the functional groups of at least the cellulosic portions of the materials can be altered. Ionizing radiation and any applied quenching step can also be used to control the functionalization of the cellulosic or lignocellulosic material, i.e., the functional groups that are present on or within the material.

In one aspect, the invention features a method comprising irradiating a lignocellulosic or cellulosic material to provide an irradiated lignocellulosic or cellulosic material containing a larger number of carboxylic acid groups than the cellulosic or lignocellulosic material prior to irradiation. The number of carboxylic acid groups is determined by titration.

Some implementations include one or more of the following features.

The treated material can also include functional groups selected from the group consisting of aldehyde groups, nitroso groups, nitrile groups, nitro groups, ketone groups, amino groups, alkyl amino groups, alkyl groups, chloroalkyl groups, chlorofluoroalkyl groups, and enol groups.

In some implementations, the irradiated material may include a plurality of saccharide units arranged in a molecular chain, and from about 1 out of every 5 to about 1 out of every 1500 saccharide units comprises a nitroso, nitro, or nitrile group, e.g., from about 1 out of every 10 to about 1 out of every 1000 saccharide units of each chain comprises a nitroso, nitro, or nitrile group, or from about 1 out of every 35 to about 1 out of every 750 saccharide units of each chain comprises a nitroso, nitro, or nitrile group. In some cases the irradiated material comprises a mixture of nitrile groups and carboxylic acid groups.

In some embodiments, the saccharide units can include substantially only a single type of group, such as a carboxylic acid group, a nitrile group, a nitroso group or a nitro group.

The naturally occurring cellulosic or lignocellulosic fibrous material can, for example, be selected from the group consisting of wood, paper, and textile fibers. In some cases, the lignocellulosic or cellulosic material comprises a fibrous material.

The irradiated material may include a plurality of saccharide units arranged in a molecular chain, and from about 1 out of every 2 to about 1 out of every 250 saccharide units can include a carboxylic acid group, or an ester or salt thereof. The irradiated material may include a plurality of such molecular chains. In some cases from about 1 out of every 5 to about 1 out of every 250 saccharide units of each chain comprises a carboxylic acid group, or an ester or salt thereof, e.g., from about 1 out of every 8 to about 1 out of every 100 saccharide units of each chain comprises a carboxylic acid group, or an ester or salt thereof, or from about 1 out of every 10 to about 1 out of every 50 saccharide units of each chain comprise a carboxylic acid group, or an ester or salt thereof. The saccharide units can, for example, comprise 5 or 6 carbon saccharide units, and each chain can have between about 10 and about 200 saccharide units, e.g., between about 10 and about 100 or between about 10 and about 50. In some embodiments each chain comprises hemicellulose or cellulose.

In some cases the average molecular weight of the irradiated material relative to PEG standards is from about 1,000 to about 1,000,000, wherein the molecular weight is determined using GPC, utilizing a saturated solution (8.4% by weight) of lithium chloride (LiCl) in dimethyl acetamide (DMAc) as the mobile phase.

Irradiating may be performed using a device that is disposed in a vault.

In another aspect, the invention features a method comprising surface treating with a coating or a dye a cellulosic or lignocellulosic material that has been irradiated to functionalize the material with carboxylic acid groups not present in a naturally occurring cellulosic or lignocellulosic material from which the irradiated material was obtained.

In another aspect, the invention features a cellulosic or lignocellulosic material that includes a significantly larger number of carboxylic acid groups than in naturally occurring versions of the cellulosic or lignocellulosic material.

In yet another aspect, the invention features a method comprising grafting a material onto grafting sites of a cellulosic or lignocellulosic material that has been irradiated to provide a functionalized cellulosic material having a plurality of grafting sites.

In some cases, the grafting material comprises a reactive dye.

The irradiated material can be, for example, paper, a textile material, wood, or a product containing wood. Any of these products can be coated or uncoated. For example, in the case of a textile the textile can have a sizing coating such as starch or a starch derivative.

Textile materials can include, for example, yarns or fabrics. In some cases, the α-cellulose content of the material can be less than about 80%. The fibrous cellulosic materials can be selected from the group consisting of flax, hemp, jute, abaca, sisal, banana fiber, coconut fiber, wheat straw, LF, ramie, bamboo fibers, cuprammonium cellulose, regenerated wood cellulose, lyocell, cellulose acetate, and blends thereof. Other useful fibers include fibers made from corn or other starch- or protein-containing plant or vegetable materials such as soy, milk-based fibers, and chitin fibers made from, e.g., shrimp or crab shells. The fibrous cellulosic materials can have a lignin content of at least 2%. The fibrous cellulosic materials can be irradiated prior to, during, or after being spun, woven, knitted, or entangled. Irradiation of textile materials is discussed in U.S. Provisional Application Nos. 61/049,394 and 61/073, 436, the full disclosures of which are incorporated herein by reference.

The full disclosures of each of the following U.S. patent applications, which are being filed concurrently herewith, are hereby incorporated by reference herein: U.S. application Ser. No. 12/417,707, filed Apr. 3, 2009, now U.S. Pat. No. 7,867,358, issued Jan. 11, 2011; U.S. application Ser. No. 12/417,720, filed Apr. 3, 2009, now U.S. Pat. No. 7,846,295, issued Dec. 7, 2010; U.S. application Ser. No. 12/417,699, filed Apr. 3, 2009, now U.S. Pat. No. 7,931,784, issued Apr. 26, 2011; U.S. application Ser. No. 12/417,840, filed Apr. 3, 2009; U.S. application Ser. No. 12/417,731, filed Apr. 3, 2009; U.S. application Ser. No. 12/417,900, filed Apr. 3, 2009; U.S. application Ser. No. 12/417,880, filed Apr. 3, 2009, now U.S. Pat. No. 8,212,087, issued Jul. 3, 2012; U.S. application Ser. No. 12/417,723, filed Apr. 3, 2009; U.S. application Ser. No. 12/417,786, filed Apr. 3, 2009, now U.S. Pat. No. 8,025,098, issued Sep. 27, 2011.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All mentioned publications, patent applications, patents, and other references are incorporated herein by reference in their entirety. In case of conflict, the present specification, including definitions, will control. In addition, the materials, methods and examples are illustrative only and not intended to be limiting.

Other features and advantages of the invention will be apparent from the following detailed description, and from the claims.

DESCRIPTION OF DRAWINGS

FIGS. 6L-6M are $^{13}$C-NMR of sample P-100e with a delay time of 10 seconds.

DETAILED DESCRIPTION

Figure 1:
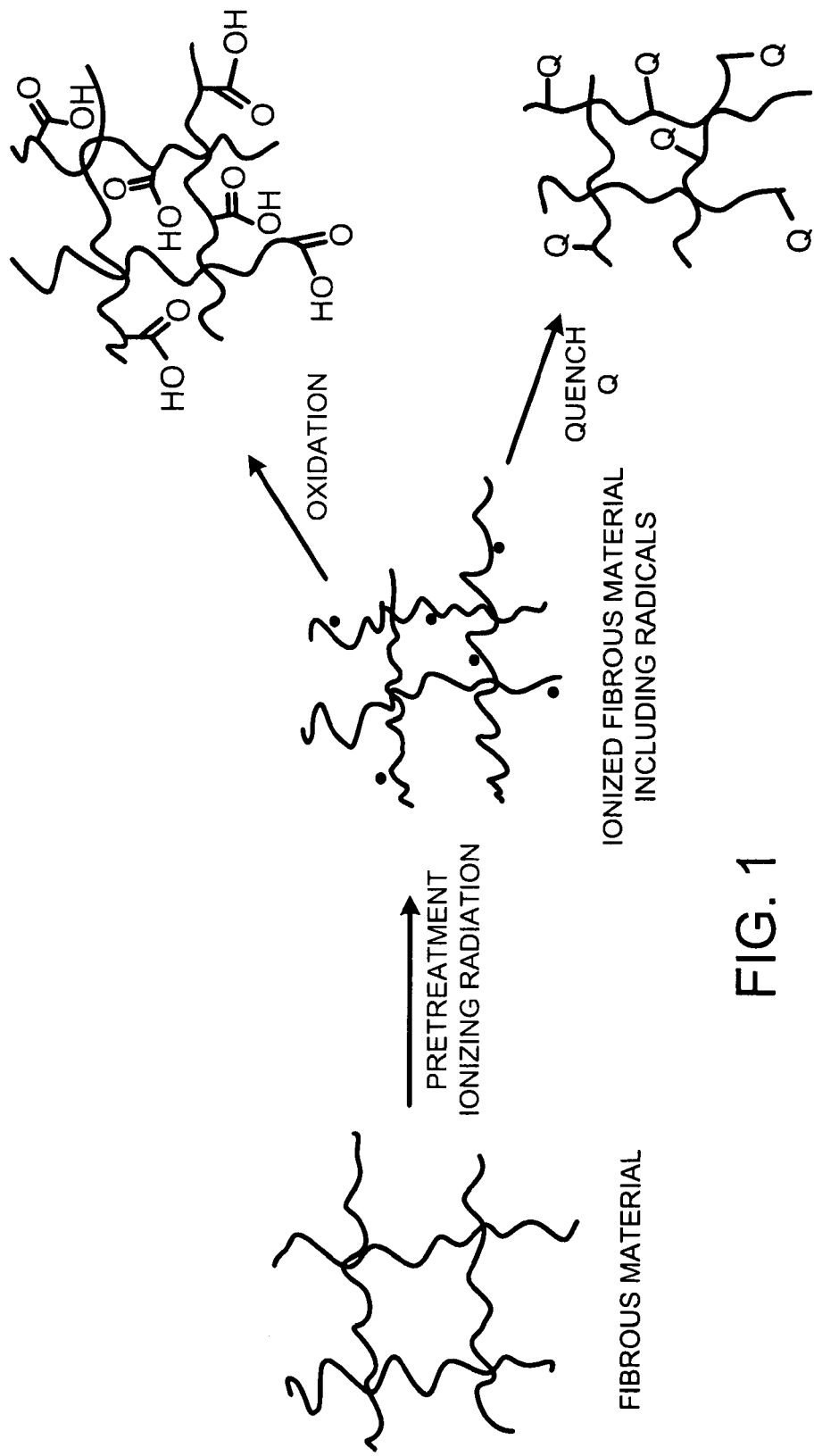
FIG. 1 is a diagram that illustrates changing a molecular and/or a supramolecular structure of a fibrous material.

As discussed above, the invention is based, in part, on the discovery that by irradiating fibrous materials, i.e., cellulosic and lignocellulosic materials, at appropriate levels, the molecular structure of at least a cellulosic portion of the fibrous material can be changed.

Various cellulosic and lignocellulosic materials, their uses, and applications have been described in U.S. Pat. Nos. 7,307,108, 7,074,918, 6,448,307, 6,258,876, 6,207,729, 5,973,035 and 5,952,105; and in various patent applications, including "FIBROUS MATERIALS AND COMPOSITES," PCT/US2006/010648, filed on Mar. 23, 2006, and "FIBROUS MATERIALS AND COMPOSITES," U.S. Patent Application Publication No. 2007/0045456. The aforementioned documents are all incorporated by reference herein in their entireties.

Ionizing radiation can be used to control the functionalization of the fibrous material, i.e., the functional groups that are present on or within the material, which can increase solubility and/or dispersibility during pulping, and can favorably affect the surface properties of a the material, e.g., the receptivity of the surface to coatings, inks and dyes and the available grafting sites.

Irradiating can be conducted under conditions that favorably alter the functional groups present in the material.

In some embodiments, after irradiation from about 1 out of every 2 to about 1 out of every 250 saccharide units includes a carboxylic acid group, or an ester or salt thereof; whereas the native or unprocessed base material can have less than 1 carboxylic acid group per 300 saccharide units. In other embodiments, from about 1 out of every 5 to about 1 out of every 250 saccharide units, e.g., 1 out of every 8 to about 1 out of every 100 units or from 1 out of 10 to about 1 out of 50 units includes a carboxylic acid group, or an ester or salt thereof.

In some embodiments, in the irradiated material from about 1 out of every 5 to about 1 out of every 1500 saccharide units includes a nitrile group, a nitroso groups or a nitro group. In other embodiments, from about 1 out of every 10 to about 1 out of every 1000 saccharide units, e.g., 1 out of every 25 to about 1 out of every 1000 units or from 1 out of 35 to about 1 out of 750 units includes a nitrile group, a nitroso groups or a nitro group.

In some embodiments, the saccharide units include mixtures of carboxylic acid groups, nitrile groups, nitroso groups and nitro groups. Mixed groups can enhance the solubility of a cellulosic or lignocellulosic material.

If desired, irradiation may be performed multiple times to achieve a given final dose, e.g., delivering a dose of 1 MRad repeated 10 times, to provide a final dose of 10 MRad. This may prevent overheating of the irradiated material, particularly if the material is cooled between doses.

Irradiating to Affect Material Functional Groups

After treatment with one or more ionizing radiations, such as photonic radiation (e.g., X-rays or gamma-rays), e-beam radiation or irradiation with particles heavier than electrons that are positively or negatively charged (e.g., protons or carbon ions), any of the carbohydrate-containing materials or mixtures described herein become ionized; that is, they include radicals at levels that are detectable, for example, with an electron spin resonance spectrometer. After ionization, any material that has been ionized can be quenched to reduce the level of radicals in the ionized material, e.g., such that the radicals are no longer detectable with the electron spin resonance spectrometer. For example, the radicals can be quenched by the application of sufficient pressure to the ionized material and/or by contacting the ionized material with a fluid, such as a gas or liquid, that reacts with (quenches) the radicals.

Various gases, for example nitrogen or oxygen, or liquids, can be used to at least aid in the quenching of the radicals and to functionalize the ionized material with desired functional groups. Thus, irradiation followed by quenching can be used to provide a material with desired functional groups, including, for example, one or more of the following: aldehyde groups, enol groups, nitroso groups, nitrile groups, nitro groups, ketone groups, amino groups, alkyl amino groups, alkyl groups, chloroalkyl groups, chlorofluoroalkyl groups, and/or carboxylic acid groups.

These groups can in some instances increase the hydrophilicity of the region of the material where they are present. In some implementations, for example, a paper web is irradiated and quenched, before or after processing steps such as coating and calendering, to affect the functionality within and/or at the surface of the paper and thereby affect the ink receptivity and other properties of the paper. In other implementations, the paper feedstock is irradiated with a relatively high dose of ionizing radiation, to facilitate pulping, and then later quenched to improve the stability of the ionized material in the pulp.

FIG. 1 illustrates changing a molecular and/or a supramolecular structure of fibrous material, such as paper feedstock, paper precursor (e.g., a wet paper web), or paper, by pretreating the fibrous material with ionizing radiation, such as with electrons or ions of sufficient energy to ionize the material, to provide a first level of radicals. As shown in FIG. 1, if the ionized material remains in the atmosphere, it will be oxidized, e.g., to an extent that carboxylic acid groups are generated by reaction with the atmospheric oxygen. In some instances, with some materials, such oxidation is desired, because it can aid in further breakdown in molecular weight of the carbohydrate-containing material (for example, if irradiation is being used to facilitate pulping). However, since the radicals can "live" for some time after irradiation, e.g., longer than 1 day, 5 days, 30 days, 3 months, 6 months, or even longer than 1 year, material properties can continue to change over time, which in some instances can be undesirable.

Detecting radicals in irradiated samples by electron spin resonance spectroscopy and radical lifetimes in such samples is discussed in Bartolotta et al., Physics in Medicine and Biology, 46 (2001), 461-471 and in Bartolotta et al., Radiation Protection Dosimetry, Vol. 84, Nos. 1-4, pp. 293-296 (1999). The ionized material can be quenched to functionalize and/or to stabilize the ionized material.

In some embodiments, quenching includes application of pressure to the ionized material, such as by mechanically deforming the material, e.g., directly mechanically compressing the material in one, two, or three dimensions, or applying pressure to fluid in which the material is immersed, e.g., isostatic pressing. In the case of paper that has been ionized, pressure may be applied, e.g., by passing the paper through a nip. In such instances, the deformation of the material itself brings radicals, which are often trapped in crystalline domains, into proximity close enough for the radicals to recombine, or react with another group. In some instances, pressure is applied together with application of heat, e.g. a quantity of heat sufficient to elevate the temperature of the material to above a melting point or softening point of a component of the ionized material, such as lignin, cellulose or hemicellulose. Heat can improve molecular mobility in the material, which can aid in quenching of radicals. When pressure is utilized to quench, the pressure can be greater than about 1000 psi, such as greater than about 1250 psi, 1450 psi, 3625 psi, 5075 psi, 7250 psi, 10000 psi, or even greater than 15000 psi.

In some embodiments, quenching includes contacting the ionized material with fluid, such as liquid or gas, e.g., a gas capable of reacting with the radicals, such as acetylene or a mixture of acetylene in nitrogen, ethylene, chlorinated ethylenes or chlorofluoroethylenes, propylene or mixtures of these gases. In other particular embodiments, quenching includes contacting the ionized material with liquid, e.g., a liquid soluble in, or at least capable of penetrating into, the ionized material and reacting with the radicals, such as a diene, such as 1,5-cyclooctadiene. In some specific embodiments, the quenching includes contacting the ionized material with an antioxidant, such as Vitamin E. If desired, the material can include an antioxidant dispersed therein, and quenching can come from contacting the antioxidant dispersed in the material with the radicals.

Other methods for quenching are possible. For example, any method for quenching radicals in polymeric materials described in Muratoglu et al., U.S. Patent Publication No. 2008/0067724 and Muratoglu et al., U.S. Pat. No. 7,166,650, the disclosures of which are incorporated herein by reference in their entireties, can be utilized for quenching any ionized material described herein. Furthermore, any quenching agent (described as a "sensitizing agent" in the above-noted Muratoglu disclosures) and/or any antioxidant described in either Muratoglu reference, can be utilized to quench any ionized material.

Functionalization can be enhanced by utilizing heavy charged ions, such as any of the heavier ions described herein. For example, if it is desired to enhance oxidation, charged oxygen ions can be utilized for the irradiation. If nitrogen functional groups are desired, nitrogen ions or any ion that includes nitrogen can be utilized. Likewise, if sulfur or phosphorus groups are desired, sulfur or phosphorus ions can be used in the irradiation.

In some embodiments, after quenching, any of the quenched ionized materials described herein can be further treated with one or more further doses of radiation, such as ionizing or non-ionizing radiation, sonication, pyrolysis, and oxidation for additional molecular and/or supramolecular structure change.

In some embodiments, the fibrous material is irradiated under a blanket of inert gas, e.g., helium or argon, prior to quenching.

The location of the functional groups can be controlled, e.g., by selecting a particular type and dose of ionizing particles. For example, gamma radiation tends to affect the functionality of molecules within paper, while electron beam radiation tends to preferentially affect the functionality of molecules at the surface.

In some cases, functionalization of the material can occur simultaneously with irradiation, rather than as a result of a separate quenching step. In this case, the type of functional groups and degree of oxidation can be affected in various ways, for example by controlling the gas blanketing the material to be irradiated, through which the irradiating beam passes. Suitable gases include nitrogen, oxygen, air, ozone, nitrogen dioxide, sulfur dioxide and chlorine.

In some embodiments, functionalization results in formation of enol groups in the fibrous material. When the fibrous material is paper, this can enhance receptivity of the paper to inks, adhesives, coatings, and the like, and can provide grafting sites. Enol groups can help break down molecular weight, especially in the presence of added base or acid. Thus, the presence of such groups can assist with pulping. In the finished paper product, generally the pH is close enough to neutral that these groups will not cause a deleterious decrease in molecular weight.

In some implementations, the material is irradiated and quenched before or after processing steps such as dyeing and sizing, to affect the functionality within and/or at the surface of the material and thereby affect properties of the material such as the receptivity of the material surface to sizes, dyes, coatings, and the like, and the adherence of sizes, dyes, coatings, and the like to the material.

Functionalization can also favorably change various textile properties. For example, functionalization can change the charge density of a textile material. In some implementations, functionalization can enhance moisture regain (as measured according to ASTM D2495), e.g., the moisture regain of the textile can be increased by at least 5%, 10%, 25%, 50%, 100%, 250%, or 500% relative to untreated cellulosic material. This increase in moisture regain can be significant in enhancing wicking action, bend recovery, and resistance to static electricity. Functionalization can also enhance the work recovery of cellulosic fibers (as measured according to ASTM D1774-94), e.g., by at least 5%, 10%, 25%, 50%, 100%, 250%, or 500% relative to untreated cellulosic material. The work recovery of the fibers can affect the wrinkle resistance of a fabric formed from the cellulosic material, with an increase in work recovery generally enhancing wrinkle resistance. Functionalization can also increase the decomposition temperature of the cellulosic material or a textile formed from the cellulosic material, e.g., by at least 3, 5, 10 or 25 degrees C. The decomposition temperature is measured by TGA in an air atmosphere, for example using IPC-TM-650 of the Institute for Interconnecting and Packaging Electronic Circuits, which references ASTM D 618 and D 3850.

In some cases, the cellulosic or lignocellulosic materials can be exposed to a particle beam in the presence of one or more additional fluids (e.g., gases and/or liquids). Exposure of a material to a particle beam in the presence of one or more additional fluids can increase the efficiency of the treatment.

In some embodiments, the material is exposed to a particle beam in the presence of a fluid such as air. Particles accelerated in any one or more of the types of accelerators disclosed herein (or another type of accelerator) are coupled out of the accelerator via an output port (e.g., a thin membrane such as a metal foil), pass through a volume of space occupied by the fluid, and are then incident on the material. In addition to directly treating the material, some of the particles generate additional chemical species by interacting with fluid particles (e.g., ions and/or radicals generated from various constituents of air, such as ozone and oxides of nitrogen). These generated chemical species can also interact with the material, and can act as initiators for a variety of different chemical bond-breaking reactions in the material. For example, any oxidant produced can oxidize the material, which can result in molecular weight reduction.

In certain embodiments, additional fluids can be selectively introduced into the path of a particle beam before the beam is incident on the material. As discussed above, reactions between the particles of the beam and the particles of the introduced fluids can generate additional chemical species, which react with the material and can assist in functionalizing the material, and/or otherwise selectively altering certain properties of the material. The one or more additional fluids can be directed into the path of the beam from a supply tube, for example. The direction and flow rate of the fluid(s) that is/are introduced can be selected according to a desired exposure rate and/or direction to control the efficiency of the overall treatment, including effects that result from both particle-based treatment and effects that are due to the interaction of dynamically generated species from the introduced fluid with the material. In addition to air, exemplary fluids that can be introduced into the ion beam include oxygen, nitrogen, one or more noble gases, one or more halogens, and hydrogen.

Cooling Irradiated Materials

During treatment of the materials discussed above with ionizing radiation, especially at high dose rates, such as at rates greater then 0.15 Mrad per second, e.g., 0.25 Mrad/s, 0.35 Mrad/s, 0.5 Mrad/s, 0.75 Mrad/s or even greater than 1 Mrad/sec, the materials can retain significant quantities of heat so that the temperature of the material becomes elevated. While higher temperatures can, in some embodiments, be advantageous, e.g., when a faster reaction rate is desired, it is advantageous to control the heating to retain control over the chemical reactions initiated by the ionizing radiation, such as crosslinking, chain scission and/or grafting, e.g., to maintain process control.

For example, in one method, the material is irradiated at a first temperature with ionizing radiation, such as photons, electrons or ions (e.g., singularly or multiply charged cations or anions), for a sufficient time and/or a sufficient dose to elevate the material to a second temperature higher than the first temperature. The irradiated material is then cooled to a third temperature below the second temperature. If desired, the cooled material can be treated one or more times with radiation, e.g., with ionizing radiation. If desired, cooling can be applied to the material after and/or during each radiation treatment.

Cooling can in some cases include contacting the material with a fluid, such as a gas, at a temperature below the first or second temperature, such as gaseous nitrogen at or about 77 K. Even water, such as water at a temperature below nominal room temperature (e.g., 25 degrees Celsius) can be utilized in some implementations.

Types of Radiation

The radiation can be provided, e.g., by: 1) heavy charged particles, such as alpha particles; 2) electrons, produced, for example, in beta decay or electron beam accelerators; or 3) electromagnetic radiation, e.g., gamma rays, x-rays or ultraviolet rays. Different forms of radiation ionize the biomass via particular interactions, as determined by the energy of the radiation.

Heavy charged particles primarily ionize matter via Coulomb scattering; furthermore, these interactions produce energetic electrons that can further ionize matter. Alpha particles are identical to the nucleus of a helium atom and are produced by alpha decay of various radioactive nuclei, such as isotopes of bismuth, polonium, astatine, radon, francium, radium, several actinides, such as actinium, thorium, uranium, neptunium, curium, californium, americium and plutonium.

Electrons interact via Coulomb scattering and bremssthrahlung radiation produced by changes in the velocity of electrons. Electrons can be produced by radioactive nuclei that undergo beta decay, such as isotopes of iodine, cesium, technetium and iridium. Alternatively, an electron gun can be used as an electron source via thermionic emission.

Electromagnetic radiation interacts via three processes: photoelectric absorption, Compton scattering and pair production. The dominating interaction is determined by the energy of incident radiation and the atomic number of the material. The summation of interactions contributing to the absorbed radiation in cellulosic material can be expressed by the mass absorption coefficient.

Electromagnetic radiation is subclassified as gamma rays, x-rays, ultraviolet rays, infrared rays, microwaves or radio waves, depending on its wavelength.

Figure 2:
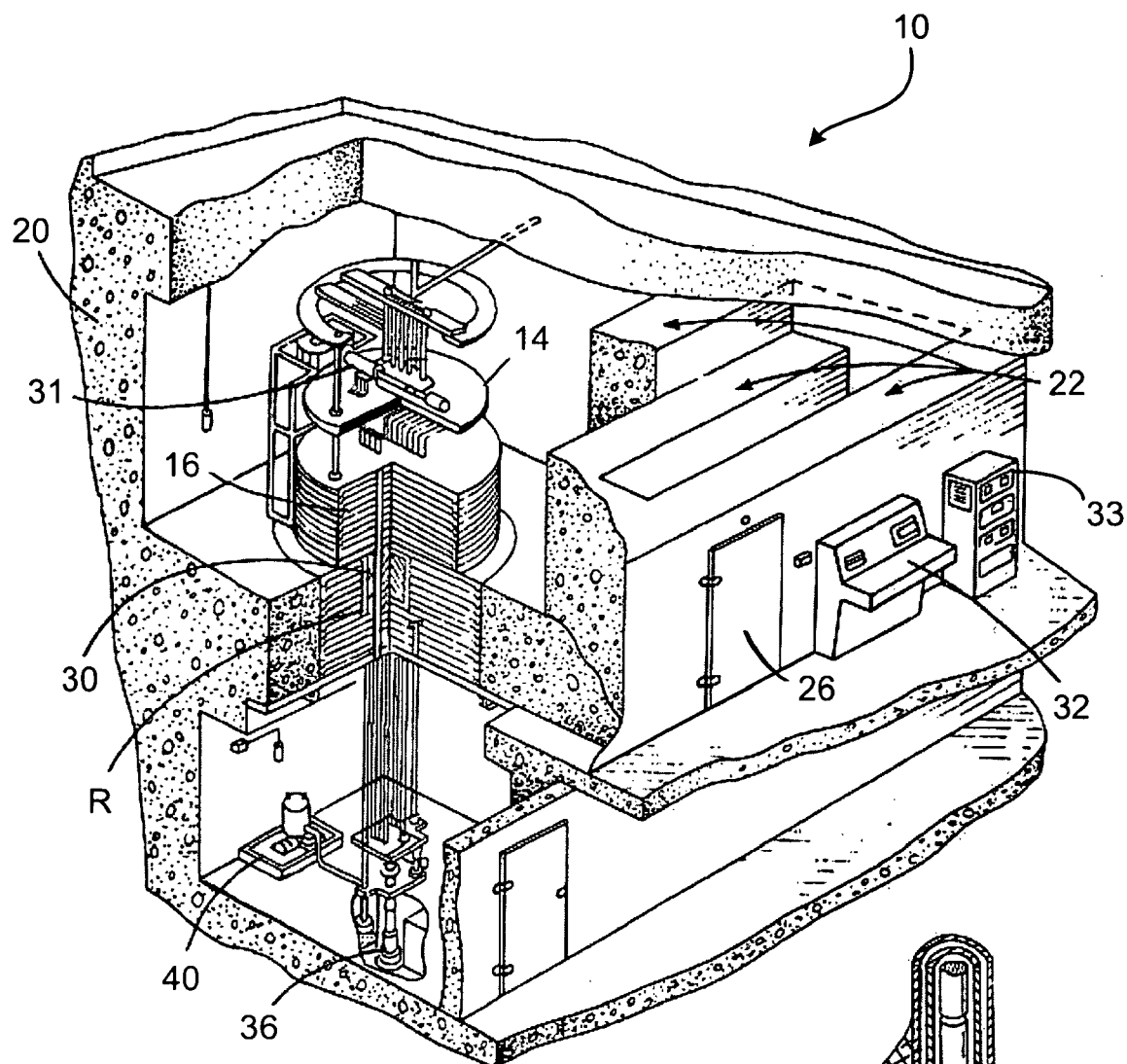
FIG. 2 is a perspective, cut-away view of a gamma irradiator housed in a concrete vault.
Figure 3:
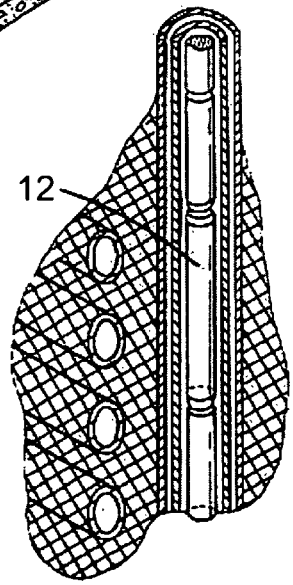
FIG. 3 is an enlarged perspective view of region, R, of FIG. 2.

For example, gamma radiation can be employed to irradiate the materials. Referring to FIGS. 2 and 3 (an enlarged view of region R), a gamma irradiator 10 includes gamma radiation sources 408, e.g., $^{60}$Co pellets, a working table 14 for holding the materials to be irradiated and storage 16, e.g., made of a plurality of iron plates, all of which are housed in a concrete containment chamber (vault) 20 that includes a maze entranceway 22 beyond a lead-lined door 26. Storage 16 defines a plurality of channels 30, e.g., sixteen or more channels, allowing the gamma radiation sources to pass through storage on their way proximate the working table.

In operation, the sample to be irradiated is placed on a working table. The irradiator is configured to deliver the desired dose rate and monitoring equipment is connected to an experimental block 31. The operator then leaves the containment chamber, passing through the maze entranceway and through the lead-lined door. The operator mans a control panel 32, instructing a computer 33 to lift the radiation sources 12 into working position using cylinder 36 attached to hydraulic pump 40.

Gamma radiation has the advantage of significant penetration depth into a variety of materials in the sample. Sources of gamma rays include radioactive nuclei, such as isotopes of cobalt, calcium, technicium, chromium, gallium, indium, iodine, iron, krypton, samarium, selenium, sodium, thalium and xenon.

Sources of x-rays include electron beam collision with metal targets, such as tungsten or molybdenum or alloys, or compact light sources, such as those produced commercially by Lyncean Technologies, Inc., of Palo Alto, Calif.

Sources for ultraviolet radiation include deuterium or cadmium lamps.

Sources for infrared radiation include sapphire, zinc or selenide window ceramic lamps.

Sources for microwaves include klystrons, Slevin type RF sources or atom beam sources that employ hydrogen, oxygen or nitrogen gases.

In some embodiments, a beam of electrons is used as the radiation source. A beam of electrons has the advantages of high dose rates (e.g., 1, 5, or even 10 MRad per second), high throughput, less containment and less confinement equipment. Electrons can also be more efficient at causing chain scission. In addition, electrons having energies of 4-10 MeV can have penetration depths of 5 to 30 mm or more, such as 40 mm.

Electron beams can be generated, e.g., by electrostatic generators, cascade generators, transformer generators, low energy accelerators with a scanning system, low energy accelerators with a linear cathode, linear accelerators, and pulsed accelerators. Electrons as an ionizing radiation source can be useful, e.g., for relatively thin materials, e.g., less than 0.5 inch, e.g., less than 0.4 inch, 0.3 inch, 0.2 inch, or less than 0.1 inch. In some embodiments, the energy of each electron of the electron beam is from about 0.25 MeV to about 7.5 MeV (million electron volts), e.g., from about 0.5 MeV to about 5.0 MeV, or from about 0.7 MeV to about 2.0 MeV. Electron beam irradiation devices may be procured commercially from Ion Beam Applications, Louvain-la-Neuve, Belgium or from Titan Corporation, San Diego, Calif. Typical electron energies can be 1, 2, 4.5, 7.5, or 10 MeV. Typical electron beam irradiation device power can be 1, 5, 10, 20, 50, 100, 250, or 500 kW. Typical doses may take values of 1, 5, 10, 20, 50, 100, or 200 kGy.

Tradeoffs in considering electron beam irradiation device power specifications include operating costs, capital costs, depreciation and device footprint. Tradeoffs in considering exposure dose levels of electron beam irradiation would be energy costs and environment, safety, and health (ESH) concerns. Typically, generators are housed in a vault, e.g., of lead or concrete.

The electron beam irradiation device can produce either a fixed beam or a scanning beam. A scanning beam may be advantageous with large scan sweep length and high scan speeds, as this would effectively replace a large, fixed beam width. Further, available sweep widths of 0.5 m, 1 m, 2 m or more are available.

In embodiments in which the irradiating is performed with electromagnetic radiation, the electromagnetic radiation can have an energy per photon (in electron volts) of, e.g., greater than $10^2$ eV, e.g., greater than $10^3$, $10^4$, $10^5$, $10^6$ or even greater than $10^7$ eV. In some embodiments, the electromagnetic radiation has energy per photon of between $10^4$ and $10^7$, e.g., between $10^5$ and $10^6$ eV. The electromagnetic radiation can have a frequency of, e.g., greater than $10^{16}$ hz, greater than $10^{17}$ hz, $10^{18}$, $10^{19}$, $10^{20}$ or even greater than $10^{21}$ hz. In some embodiments, the electromagnetic radiation has a frequency of between $10^{18}$ and $10^{22}$ Hz, e.g., between $10^{19}$ to $10^{21}$ Hz.

Figure 4:
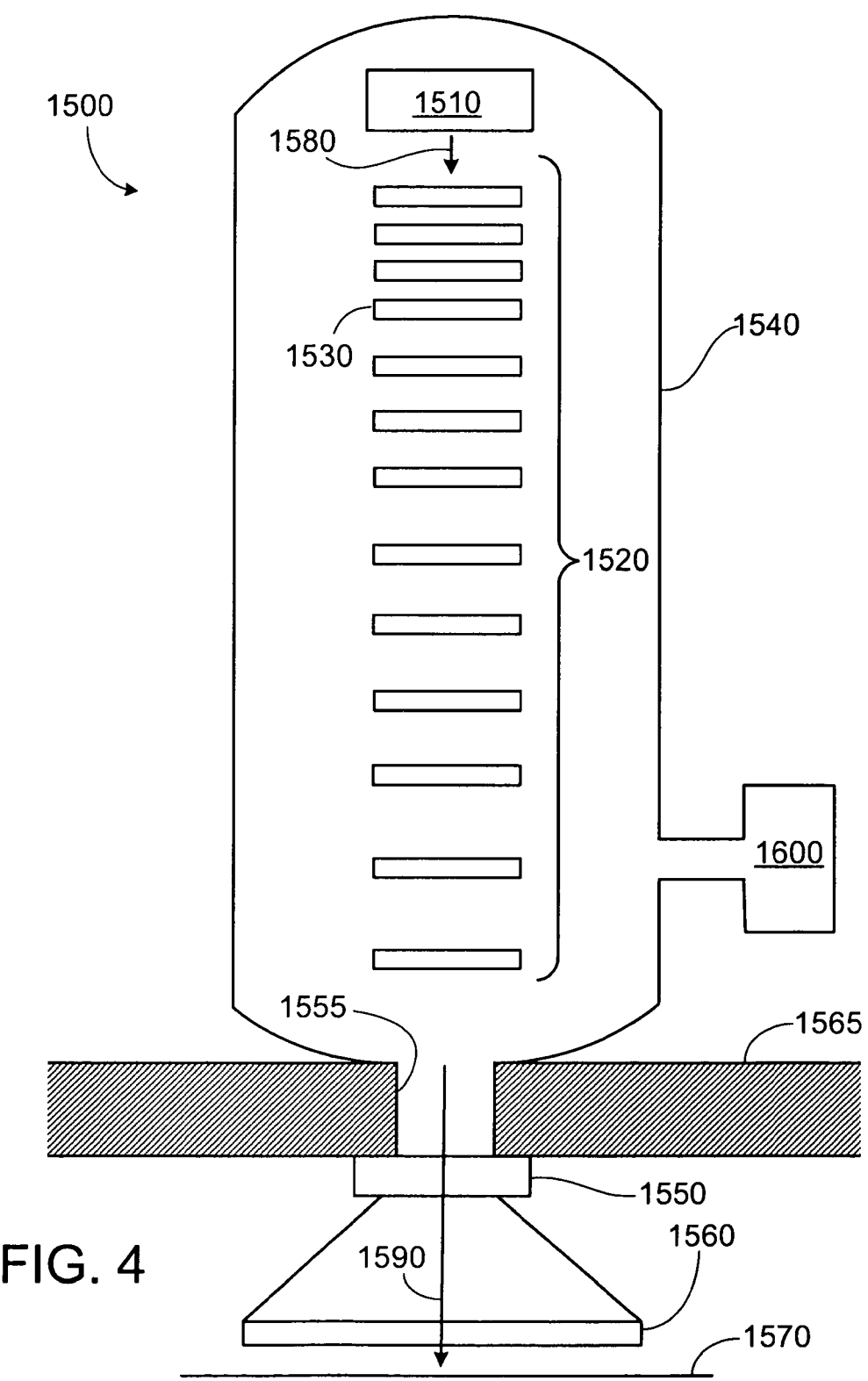
FIG. 4 is a schematic diagram of a DC accelerator.

One type of accelerator that can be used to accelerate ions produced using the sources discussed above is a Dynamitron® (available, for example, from Radiation Dynamics Inc., now a unit of IBA, Louvain-la-Neuve, Belgium). A schematic diagram of a Dynamitron® accelerator 1500 is shown in FIG. 4. Accelerator 1500 includes an injector 1510 (which includes an ion source) and an accelerating column 1520 that includes a plurality of annular electrodes 1530. Injector 1510 and column 1520 are housed within an enclosure 1540 that is evacuated by a vacuum pump 1600.

Injector 1510 produces a beam of ions 1580, and introduces beam 1580 into accelerating column 1520. The annular electrodes 1530 are maintained at different electric potentials, so that ions are accelerated as they pass through gaps between the electrodes (e.g., the ions are accelerated in the gaps, but not within the electrodes, where the electric potentials are uniform). As the ions travel from the top of column 1520 toward the bottom in FIG. 4, the average speed of the ions increases. The spacing between subsequent annular electrodes 1530 typically increases, therefore, to accommodate the higher average ion speed.

After the accelerated ions have traversed the length of column 1520, the accelerated ion beam 1590 is coupled out of enclosure 1540 through delivery tube 1555. The length of delivery tube 1555 is selected to permit adequate shielding (e.g., concrete shielding) to be positioned adjacent to column 1520, isolating the column. After passing through tube 1555, ion beam 1590 passes through scan magnet 1550. Scan magnet 1550, which is controlled by an external logic unit (not shown), can sweep accelerated ion beam 1590 in controlled fashion across a two-dimensional plane oriented perpendicular to a central axis of column 1520. As shown in FIG. 4, ion beam 1590 passes through window 1560 (e.g., a metal foil window or screen) and then is directed to impinge on selected regions of a sample 1570 by scan magnet 1550.

In some embodiments, the electric potentials applied to electrodes 1530 are static potentials, generated, e.g., by DC potential sources. In certain embodiments, some or all of the electric potentials applied to electrodes 1530 are variable potentials generated by variable potential sources. Suitable variable sources of large electric potentials include amplified field sources, e.g. such as klystrons. Accordingly, depending upon the nature of the potentials applied to electrodes 1530, accelerator 1500 can operate in either pulsed or continuous mode.

To achieve a selected accelerated ion energy at the output end of column 1520, the length of column 1520 and the potentials applied to electrodes 1530 are chosen based on considerations well-known in the art. However, it is notable that to reduce the length of column 1520, multiply-charged ions can be used in place of singly-charged ions. That is, the accelerating effect of a selected electric potential difference between two electrodes is greater for an ion bearing a charge of magnitude 2 or more than for an ion bearing a charge of magnitude 1. Thus, an arbitrary ion $X^{2+}$ can be accelerated to final energy E over a shorter length than a corresponding arbitrary ion X. Triply- and quadruply-charged ions (e.g., $X^{3+}$ and $X^{4+}$) can be accelerated to final energy E over even shorter distances. Therefore, the length of column 1520 can be significantly reduced when ion beam 1580 includes primarily multiply-charged ion species.

To accelerate positively-charged ions, the potential differences between electrodes 1530 of column 1520 are selected so that the direction of increasing field strength in FIG. 4 is downward (e.g., toward the bottom of column 1520). Conversely, when accelerator 1500 is used to accelerate negatively-charged ions, the electric potential differences between electrodes 1530 are reversed in column 1520, and the direction of increasing field strength in FIG. 4 is upward (e.g., toward the top of column 1520). Reconfiguring the electric potentials applied to electrodes 1530 is a straightforward procedure, so that accelerator 1500 can be converted relatively rapidly from accelerating positive ions to accelerating negative ions, or vice versa. Similarly, accelerator 1500 can be converted rapidly from accelerating singly-charged ions to accelerating multiply-charged ions, and vice versa.

Doses

In some embodiments, irradiation is used to reduce molecular weight (with any radiation source or a combination of sources), in which case irradiation can be performed until the material receives a dose of at least 2.5 MRad, e.g., at least 5.0, 7.5, 10.0, 100, or 500 MRad. In some embodiments, the irradiating is performed until the material receives a dose of between 3.0 MRad and 100 MRad, e.g., between 10 MRad and 100 MRad or between 25 MRad and 75 MRad. If gamma radiation is used, the dose will generally be towards the higher end of these ranges, while if electron beam radiation is used, the dose may, in some embodiments, be towards the lower end. Dosage rates will also be towards the lower end for some cellulosic materials which already have relatively low molecular weight, e.g. recycled paper.

In other embodiments, irradiation is used to increase molecular weight (with any radiation source or a combination of sources), in which case irradiation can be performed until the material receives a dose of at least 0.05 MRad, e.g., at least 0.1, 0.25, 1.0, 2.5, or 5.0 MRad. In some embodiments, irradiating is performed until the material receives a dose of between 0.1 and 2.5 MRad. Other suitable ranges include between 0.25 MRad and 4.0 MRad, between 0.5 MRad and 3.0 MRad, and between 1.0 MRad and 2.5 MRad.

Any of the doses discussed above will functionalize the material, with the degree of functionalization generally being higher the higher the dose.

In some embodiments, the irradiating is performed at a dose rate of between 5.0 and 1500.0 kilorads/hour, e.g., between 10.0 and 750.0 kilorads/hour or between 50.0 and 350.0 kilorads/hours. When high throughput is desired, e.g., in a high speed papermaking process, radiation can be applied at, e.g., 0.5 to 3.0 MRad/sec, or even faster, using cooling to avoid overheating the irradiated material.

In some embodiments in which coated paper is irradiated, the paper coating includes resin that is cross-linkable, e.g., diacrylate or polyethylene. As such, the resin crosslinks as the carbohydrate-containing material is irradiated to increase its molecular weight, which can provide a synergistic effect to optimize the scuff resistance and other surface properties of the paper. In these embodiments, the dose of radiation is selected to be sufficiently high so as to increase the molecular weight of the cellulosic fibers, i.e., at least about 0.25 to about 2.5 MRad, depending on the material, while being sufficiently low so as to avoid deleteriously affecting the paper coating. The upper limit on the dose will vary depending on the composition of the coating, but in some embodiments the preferred dose is less than about 5 MRad.

In some embodiments, two or more radiation sources are used, such as two or more ionizing radiations. For example, samples can be treated, in any order, with a beam of electrons, followed by gamma radiation and/or UV light having wavelengths from about 100 nm to about 280 nm. In some embodiments, samples are treated with three ionizing radiation sources, such as a beam of electrons, gamma radiation, and energetic UV light.

Irradiating Devices

Various irradiating devices may be used in the methods disclosed herein, including field ionization sources, electrostatic ion separators, field ionization generators, thermionic emission sources, microwave discharge ion sources, recirculating or static accelerators, dynamic linear accelerators, van de Graaff accelerators, and folded tandem accelerators. Such devices are disclosed, for example, in U.S. Provisional Application Ser. No. 61/073,665, the complete disclosure of which is incorporated herein by reference.

Acoustic Energy

Radiation may be used in combination with acoustic energy, e.g., sonic or ultrasonic energy, to improve material throughput and/or characteristics, and/or to minimize energy usage. Suitable acoustic energy systems are described, for example, in U.S. Provisional Application No. 61/049,407, the disclosure of which is incorporated herein by reference.

Additives

Any of the many additives and coatings used with cellulosic and lignocellulosic materials, e.g., in the papermaking and textile industries, can be added to or applied to the fibrous materials, papers, or any other materials and products described herein. Additives include fillers such as calcium carbonate, plastic pigments, graphite, wollastonite, mica, glass, fiber glass, silica, and talc; inorganic flame retardants such as alumina trihydrate or magnesium hydroxide; organic flame retardants such as chlorinated or brominated organic compounds; carbon fibers; and metal fibers or powders (e.g., aluminum, stainless steel). These additives can reinforce, extend, or change electrical or mechanical properties, compatibility properties, or other properties. Other additives include starch, lignin, fragrances, coupling agents, antioxidants, opacifiers, heat stabilizers, colorants such as dyes and pigments, polymers, e.g., degradable polymers, photostabilizers, and biocides. Representative degradable polymers include polyhydroxy acids, e.g., polylactides, polyglycolides and copolymers of lactic acid and glycolic acid, poly(hydroxybutyric acid), poly(hydroxyvaleric acid), poly[lactide-co-(e-caprolactone)], poly[glycolide-co-(e-caprolactone)], polycarbonates, poly(amino acids), poly(hydroxyalkanoate)s, polyanhydrides, polyorthoesters and blends of these polymers.

When additives are included, they can be present in amounts, calculated on a dry weight basis, of from below about 1 percent to as high as about 80 percent, based on total weight of the fibrous material. More typically, amounts range from between about 0.5 percent to about 50 percent by weight, e.g., from about 0.5 percent to about 5 percent, 10 percent, 20 percent, 30, percent or more, e.g., 40 percent.

Any additives described herein can be encapsulated, e.g., spray dried or microencapsulated, e.g., to protect the additives from heat or moisture during handling.

Suitable coatings include any of the many coatings used in the paper and textile industries to provide specific surface characteristics, including performance characteristics required for particular printing applications, and in the case of textiles desired tactile properties, water repellency, flame retardancy, and the like.

Process Water

In the processes disclosed herein, whenever water is used in any process, it may be grey water, e.g., municipal grey water, or black water. In some embodiments, the grey or black water is sterilized prior to use. Sterilization may be accomplished by any desired technique, for example by irradiation, steam, or chemical sterilization.

EXAMPLES

The following examples are not intended to limit the inventions recited in the claims.

Example 1

Methods of Determining Molecular Weight of Cellulosic and Lignocellulosic Materials by Gel Permeation Chromatography This example illustrates how molecular weight is determined for the materials discussed herein. Cellulosic and lignocellulosic materials for analysis were treated as follows:

A 1500 pound skid of virgin bleached white Kraft board having a bulk density of 30 lb/ft³ was obtained from International Paper. The material was folded flat, and then fed into a 3 hp Flinch Baugh shredder at a rate of approximately 15 to 20 pounds per hour. The shredder was equipped with two 12 inch rotary blades, two fixed blades and a 0.30 inch discharge screen. The gap between the rotary and fixed blades was adjusted to 0.10 inch. The output from the shredder resembled confetti (as above). The confetti-like material was fed to a Munson rotary knife cutter, Model SC30. The discharge screen had ⅛ inch openings. The gap between the rotary and fixed blades was set to approximately 0.020 inch. The rotary knife cutter sheared the confetti-like pieces across the knife-edges. The material resulting from the first shearing was fed back into the same setup and the screen was replaced with a 1/16 inch screen. This material was sheared. The material resulting from the second shearing was fed back into the same setup and the screen was replaced with a 1/32 inch screen. This material was sheared. The resulting fibrous material had a BET surface area of 1.6897 m²/g+/−0.0155 m²/g, a porosity of 87.7163 percent and a bulk density (@0.53 psia) of 0.1448 g/mL. An average length of the fibers was 0.824 mm and an average width of the fibers was 0.0262 mm, giving an average L/D of 32:1.

Sample materials presented in the following Tables 1 and 2 include Kraft paper (P), wheat straw (WS), alfalfa (A), and switchgrass (SG). The number "132" of the Sample ID refers to the particle size of the material after shearing through a 1/32 inch screen. The number after the dash refers to the dosage of radiation (MRad) and "US" refers to ultrasonic treatment. For example, a sample ID "P132-10" refers to Kraft paper that has been sheared to a particle size of 132 mesh and has been irradiated with 10 MRad.

TABLE 1

Peak Average Molecular Weight of Irradiated Kraft Paper

| Sample Source | Sample ID | Dosage[1] (MRad) | Ultrasound[2] | Average MW ± Std Dev. |
|---|---|---|---|---|
| Kraft Paper | P132 | 0 | No | 32853 ± 10006 |
|  | P132-10 | 10 | " | 61398 ± 2468** |
|  | P132-100 | 100 | " | 8444 ± 580 |

TABLE 1-continued

Peak Average Molecular Weight of Irradiated Kraft Paper

| Sample Source | Sample ID | Dosage[1] (MRad) | Ultrasound[2] | Average MW ± Std Dev. |
|---|---|---|---|---|
|  | P132-181 | 181 | " | 6668 ± 77 |
|  | P132-US | 0 | Yes | 3095 ± 1013 |

**Low doses of radiation appear to increase the molecular weight of some materials
[1]Dosage Rate = 1 MRad/hour
[2]Treatment for 30 minutes with 20 kHz ultrasound using a 1000 W horn under re-circulating conditions with the material dispersed in water.

TABLE 2

Peak Average Molecular Weight of Gamma Irradiated Materials

| Sample ID | Peak # | Dosage[1] (MRad) | Ultrasound[2] | Average MW ± Std Dev. |
|---|---|---|---|---|
| WS132 | 1 | 0 | No | 1407411 ± 175191 |
|  | 2 | " | " | 39145 ± 3425 |
|  | 3 | " | " | 2886 ± 177 |
| WS132-10* | 1 | 10 | " | 26040 ± 3240 |
| WS132-100* | 1 | 100 | " | 23620 ± 453 |
| A132 | 1 | 0 | " | 1604886 ± 151701 |
|  | 2 | " | " | 37525 ± 3751 |
|  | 3 | " | " | 2853 ± 490 |
| A132-10* | 1 | 10 | " | 50853 ± 1665 |
|  | 2 | " | " | 2461 ± 17 |
| A132-100* | 1 | 100 | " | 38291 ± 2235 |
|  | 2 | " | " | 2487 ± 15 |
| SG132 | 1 | 0 | " | 1557360 ± 83693 |
|  | 2 | " | " | 42594 ± 4414 |
|  | 3 | " | " | 3268 ± 249 |
| SG132-10* | 1 | 10 | " | 60888 ± 9131 |
| SG132-100* | 1 | 100 | " | 22345 ± 3797 |
| SG132-10-US | 1 | 10 | Yes | 86086 ± 43518 |
|  | 2 | " | " | 2247 ± 468 |
| SG132-100-US | 1 | 100 | " | 4696 ± 1465 |

*Peaks coalesce after treatment
**Low doses of radiation appear to increase the molecular weight of some materials
[1]Dosage Rate = 1 MRad/hour
[2]Treatment for 30 minutes with 20 kHz ultrasound using a 1000 W horn under re-circulating conditions with the material dispersed in water.

Gel Permeation Chromatography (GPC) is used to determine the molecular weight distribution of polymers. During GPC analysis, a solution of the polymer sample is passed through a column packed with a porous gel trapping small molecules. The sample is separated based on molecular size with larger molecules eluting sooner than smaller molecules. The retention time of each component is most often detected by refractive index (RI), evaporative light scattering (ELS), or ultraviolet (UV) and compared to a calibration curve. The resulting data is then used to calculate the molecular weight distribution for the sample.

A distribution of molecular weights rather than a unique molecular weight is used to characterize synthetic polymers. To characterize this distribution, statistical averages are utilized. The most common of these averages are the "number average molecular weight" ($M_n$) and the "weight average molecular weight" ($M_w$). Methods of calculating these values are described in the art, e.g., in Example 9 of WO 2008/073186.

The polydispersity index or PI is defined as the ratio of $M_w/M_n$. The larger the PI, the broader or more disperse the distribution. The lowest value that a PI can be is 1. This represents a monodisperse sample; that is, a polymer with all of the molecules in the distribution being the same molecular weight.

The peak molecular weight value ($M_P$) is another descriptor defined as the mode of the molecular weight distribution. It signifies the molecular weight that is most abundant in the distribution. This value also gives insight to the molecular weight distribution.

Most GPC measurements are made relative to a different polymer standard. The accuracy of the results depends on how closely the characteristics of the polymer being analyzed match those of the standard used. The expected error in reproducibility between different series of determinations, calibrated separately, is around 5-10% and is characteristic to the limited precision of GPC determinations. Therefore, GPC results are most useful when a comparison between the molecular weight distributions of different samples is made during the same series of determinations.

The lignocellulosic samples required sample preparation prior to GPC analysis. First, a saturated solution (8.4% by weight) of lithium chloride (LiCl) was prepared in dimethyl acetamide (DMAc). Approximately 100 mg of the sample was added to approximately 10 g of a freshly prepared saturated LiCl/DMAc solution, and the mixture was heated to approximately 150° C.-170° C. with stirring for 1 hour. The resulting solutions were generally light- to dark-yellow in color. The temperature of the solutions were decreased to approximately 100° C. and heated for an additional 2 hours. The temperature of the solutions was then decreased to approximately 50° C. and the sample solutions were then heated for approximately 48 to 60 hours. Of note, samples irradiated at 100 MRad were more easily solubilized as compared to their untreated counterpart. Additionally, the sheared samples (denoted by the number 132) had slightly lower average molecular weights as compared with uncut samples.

The resulting sample solutions were diluted 1:1 using DMAc as solvent and were filtered through a 0.45 µm PTFE filter. The filtered sample solutions were then analyzed by GPC. The peak average molecular weights (Mp) of the samples, as determined by Gel Permeation Chromatography (GPC), are summarized in Tables 1 and 2, above. Each sample was prepared in duplicate and each preparation of the sample was analyzed in duplicate (two injections) for a total of four injections per sample. The EasiCal® polystyrene standards PS1A and PS1B were used to generate a calibration curve for the molecular weight scale from about 580 to 7,500,00 Daltons. GPC analysis conditions are recited in Table 3, below.

TABLE 3

| GPC Analysis Conditions | |
|---|---|
| Instrument: | Waters Alliance GPC 2000 |
| | Plgel 10µ Mixed-B |
| Columns (3): | S/N's: 10M-MB-148-83; |
| | 10M-MB-148-84; 10M-MB-174-129 |
| Mobile Phase (solvent): | 0.5% LiCl in DMAc (1.0 mL/min.) |
| Column/Detector Temperature: | 70° C. |
| Injector Temperature: | 70° C. |
| Sample Loop Size: | 323.5 µL |

Example 2

Electron Beam Processing Cardboard Samples

Brown cardboard samples 0.050 inches thick were treated with a beam of electrons using a vaulted Rhodotron® TT200 continuous wave accelerator delivering 5 MeV electrons at 80 kW output power. Table 4 describes the nominal parameters for the TT200. Table 5 reports the nominal doses (in MRad) and actual doses (in kgy) delivered to the samples.

TABLE 4

| Rhodotron ® TT 200 Parameters | |
|---|---|
| Beam | |
| Beam Produced: | Accelerated electrons |
| Beam energy: | Nominal (fixed): 10 MeV (+0 keV-250 keV |
| Energy dispersion at 10 Mev: | Full width half maximum (FWHM) 300 keV |
| Beam power at 10 MeV: | Guaranteed Operating Range 1 to 80 kW |
| Power Consumption | |
| Stand-by condition (vacuum and cooling ON): | <15 kW |
| At 50 kW beam power: | <210 kW |
| At 80 kW beam power: | <260 kW |
| RF System | |
| Frequency: | 107.5 ± 1 MHz |
| Tetrode type: | Thomson TH781 |
| Scanning Horn | |
| Nominal Scanning Length (measured at 25-35 cm from window): | 120 cm |
| Scanning Range: | From 30% to 100% of Nominal Scanning Length |
| Nominal Scanning Frequency (at max. scanning length): | 100 Hz ± 5% |
| Scanning Uniformity (across 90% of Nominal Scanning Length) | ±5% |

TABLE 5

| Dosages Delivered to Samples | |
|---|---|
| Total Dosage (MRad) (Number Associated with Sample ID | Delivered Dose (kgy)[1] |
| 1 | 9.9 |
| 3 | 29.0 |
| 5 | 50.4 |
| 7 | 69.2 |
| 10 | 100.0 |
| 15 | 150.3 |
| 20 | 198.3 |
| 30 | 330.9 |
| 50 | 529.0 |
| 70 | 695.9 |
| 100 | 993.6 |

[1] For example, 9.9 kgy was delivered in 11 seconds at a beam current of 5 mA and a line speed of 12.9 feet/minute. Cool time between treatments was around 2 minutes.

The cardboard samples treated below 7 MRad were stiffer to the touch than untreated controls, but otherwise appeared visibly identical to the controls. Samples treated at about 10 MRad were of comparable stiffness to the controls to the touch, while those treated with higher doses were more flexible under manipulation. Extensive material degradation was visibly apparent for samples treated above 50 Mrad.

Example 3

Fourier Transform Infrared (FT-IR) Spectrum of Irradiated and Unirradiated Kraft Paper FT-IR analysis was performed on a Nicolet/Impact 400. The results indicate that samples P132, P132-10, P132-100, P-1e, P-5e, P-10e, P-30e, P-70e, and P-100e are consistent with a cellulose-based material.

Figure 5:
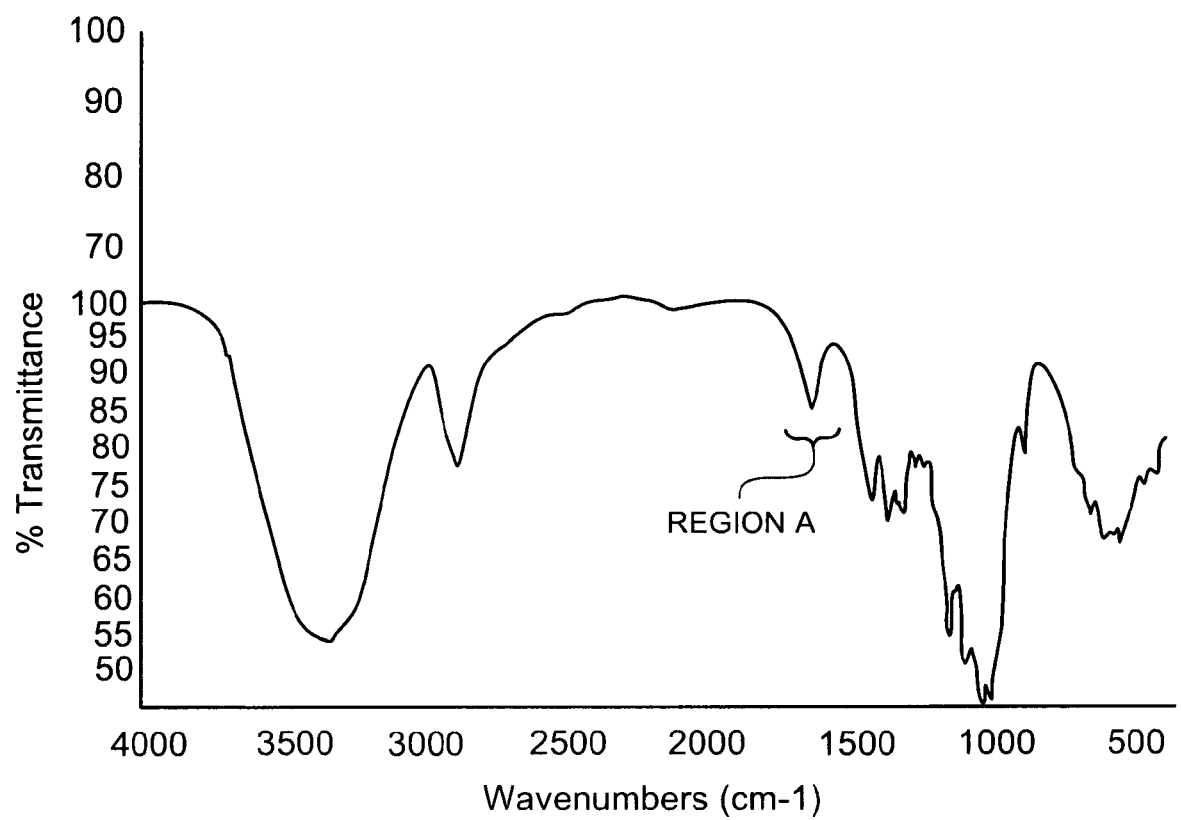
FIG. 5 is an infrared spectrum of Kraft board paper sheared on a rotary knife cutter.
Figure 6:
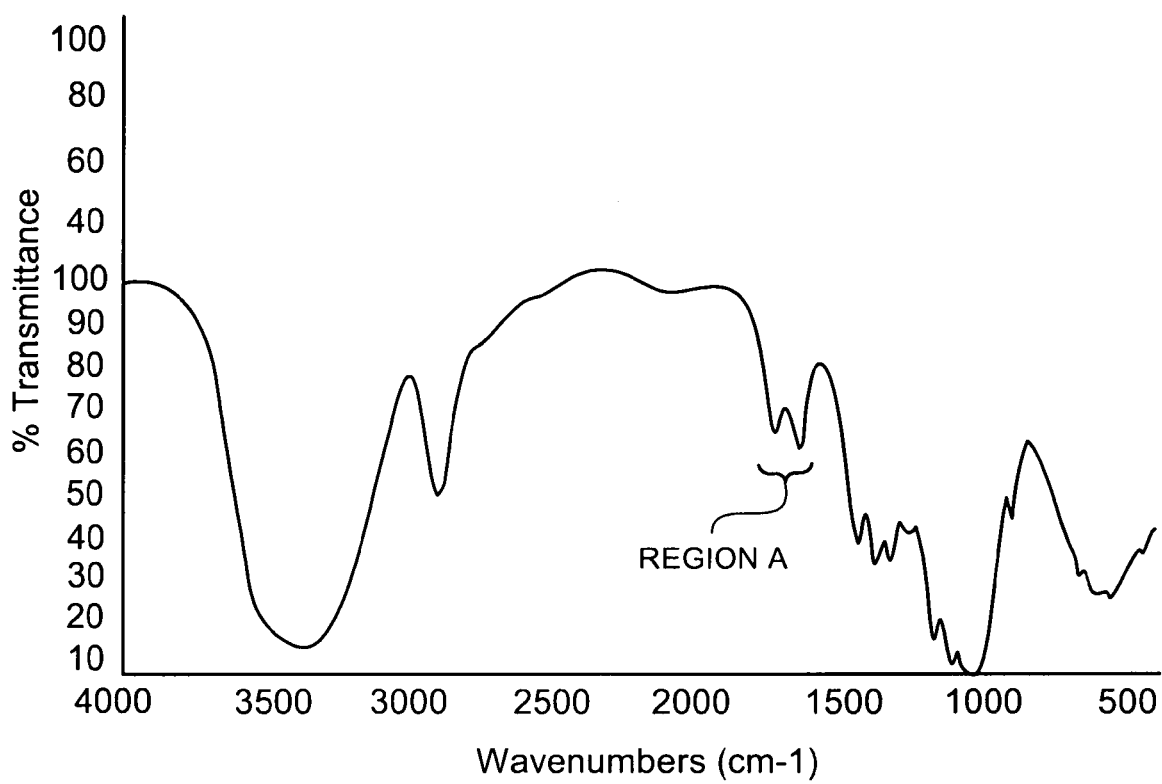
FIG. 6 is an infrared spectrum of the Kraft paper of FIG. 5 after irradiation with 100 Mrad of gamma radiation.
Figure 6A:
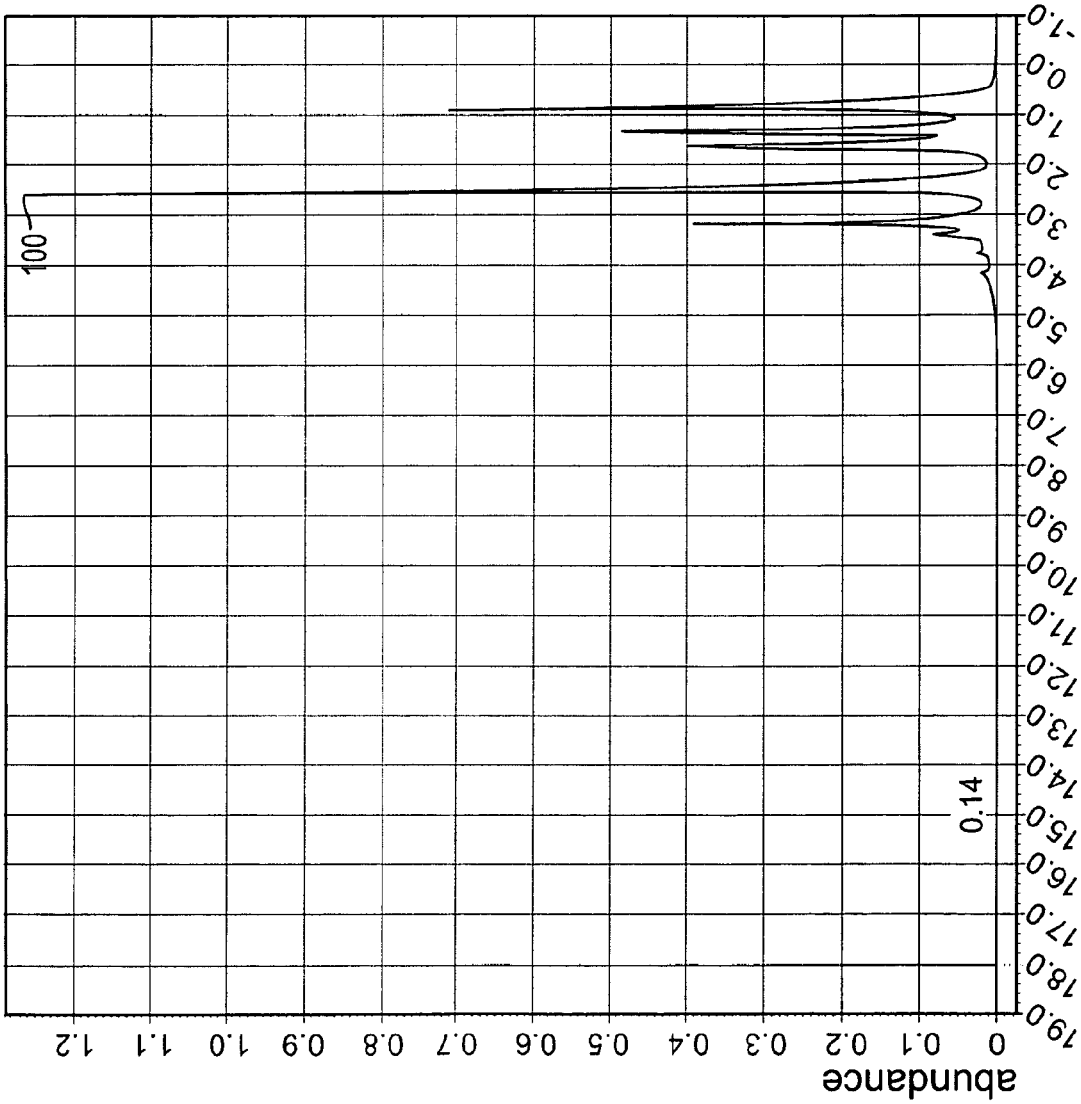
FIGS. 6A-6I are $^1$H-NMR spectra of samples P132, P132-10, P132-100, P-1e, P-5e, P-10e, P-30e, P-70e, and P-100e in Example 4.
Figure 6B:
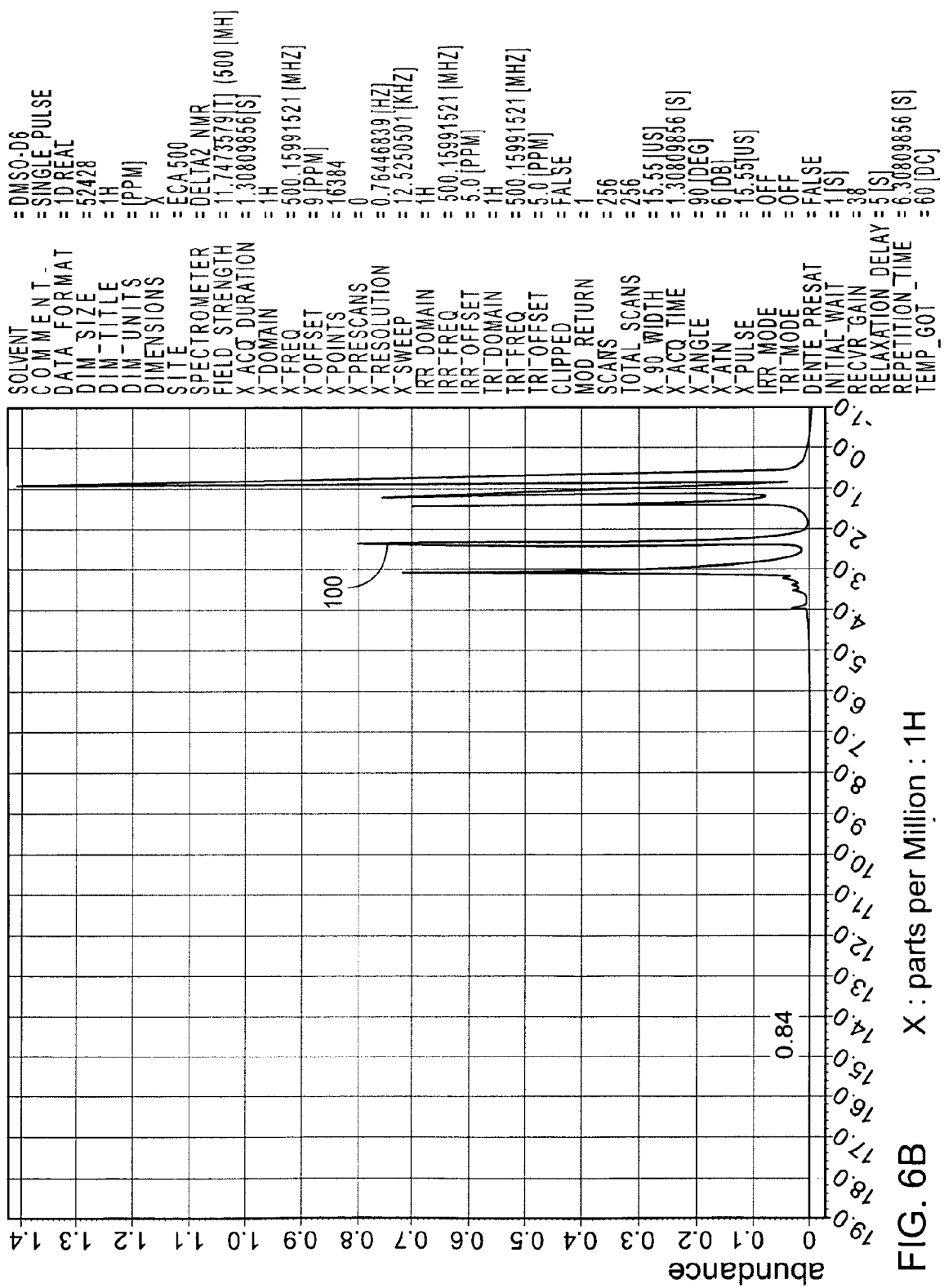
Figure 6C:
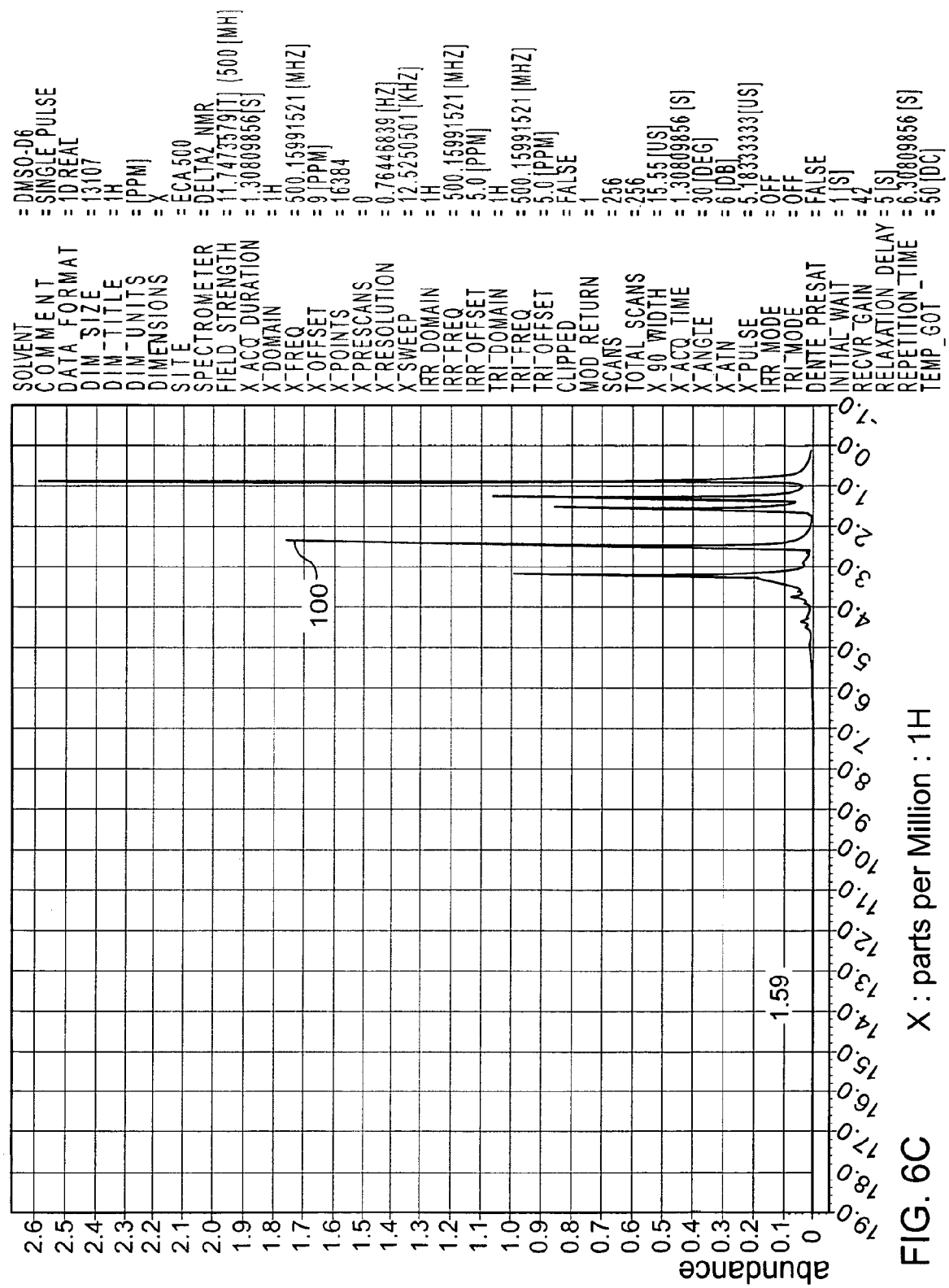
Figure 6D:
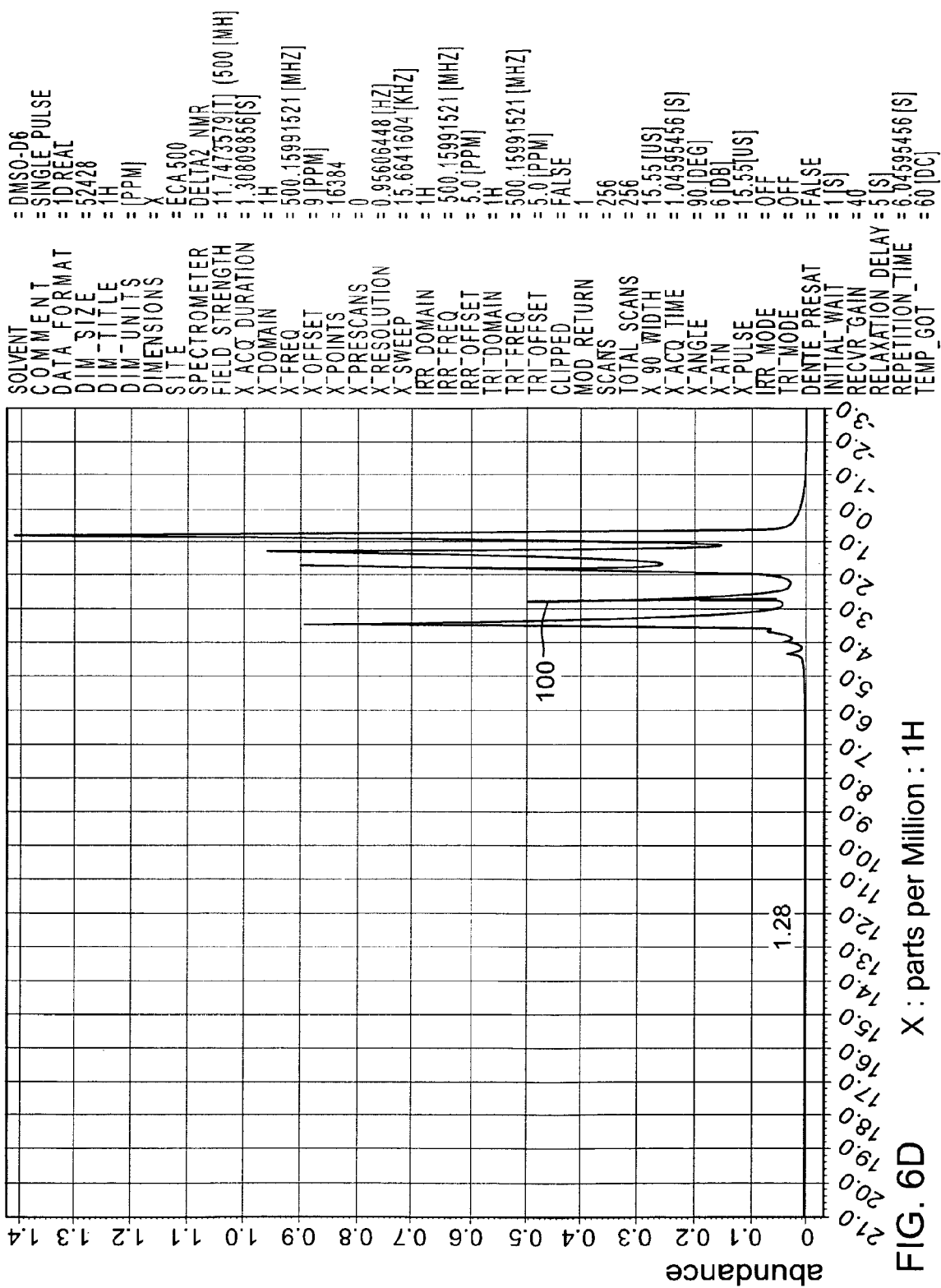
Figure 6E:
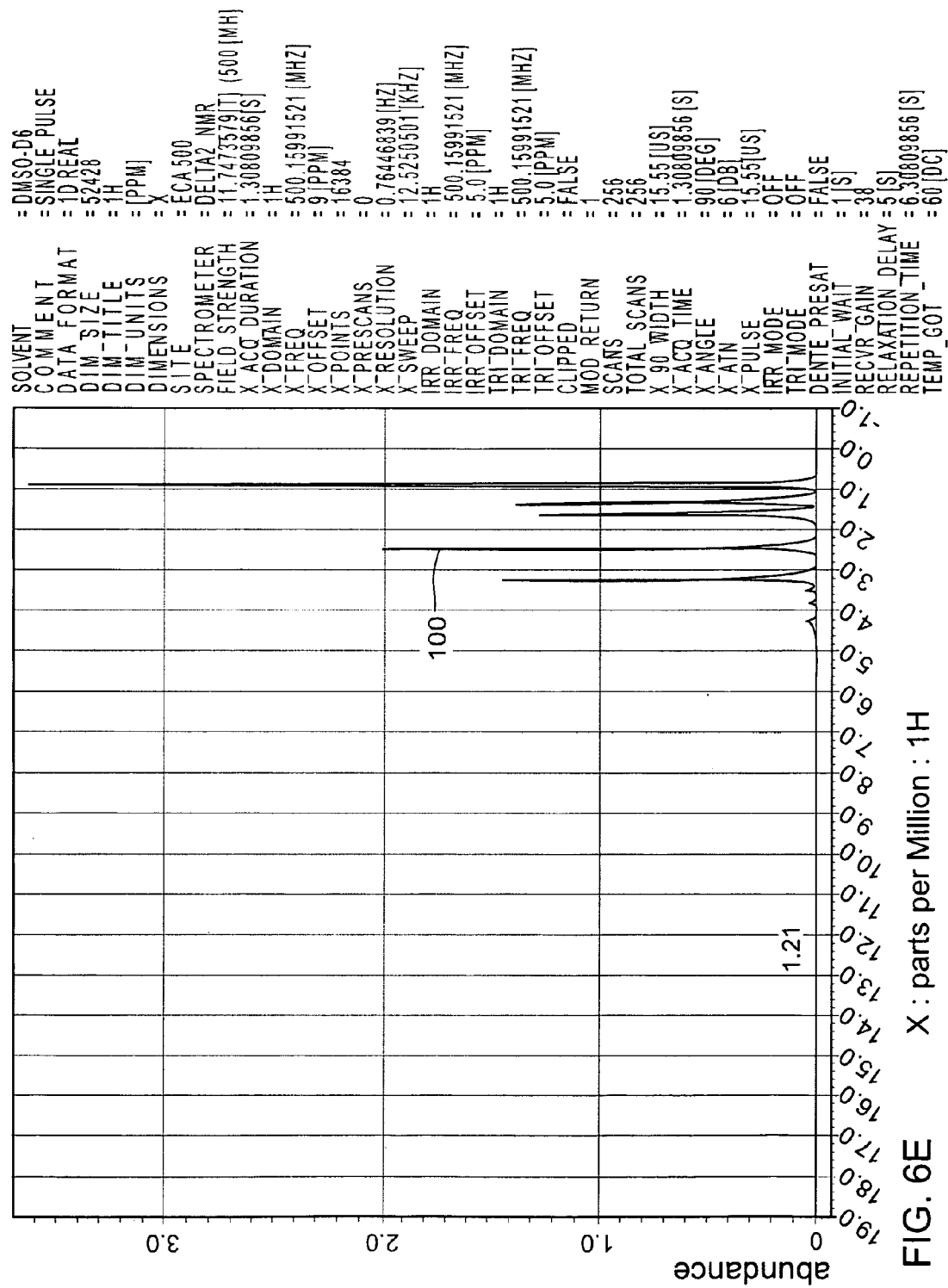
Figure 6F:
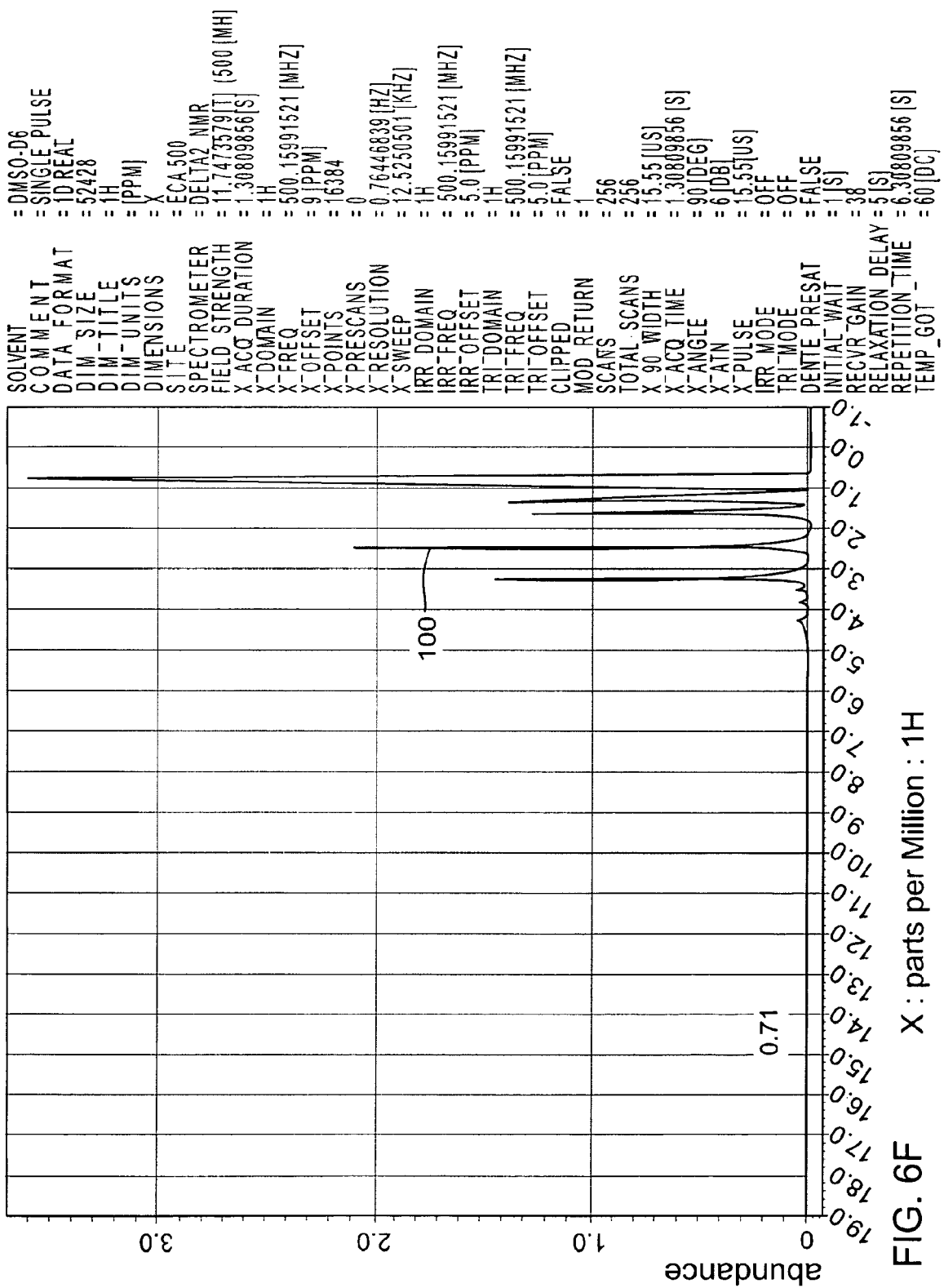
Figure 6G:
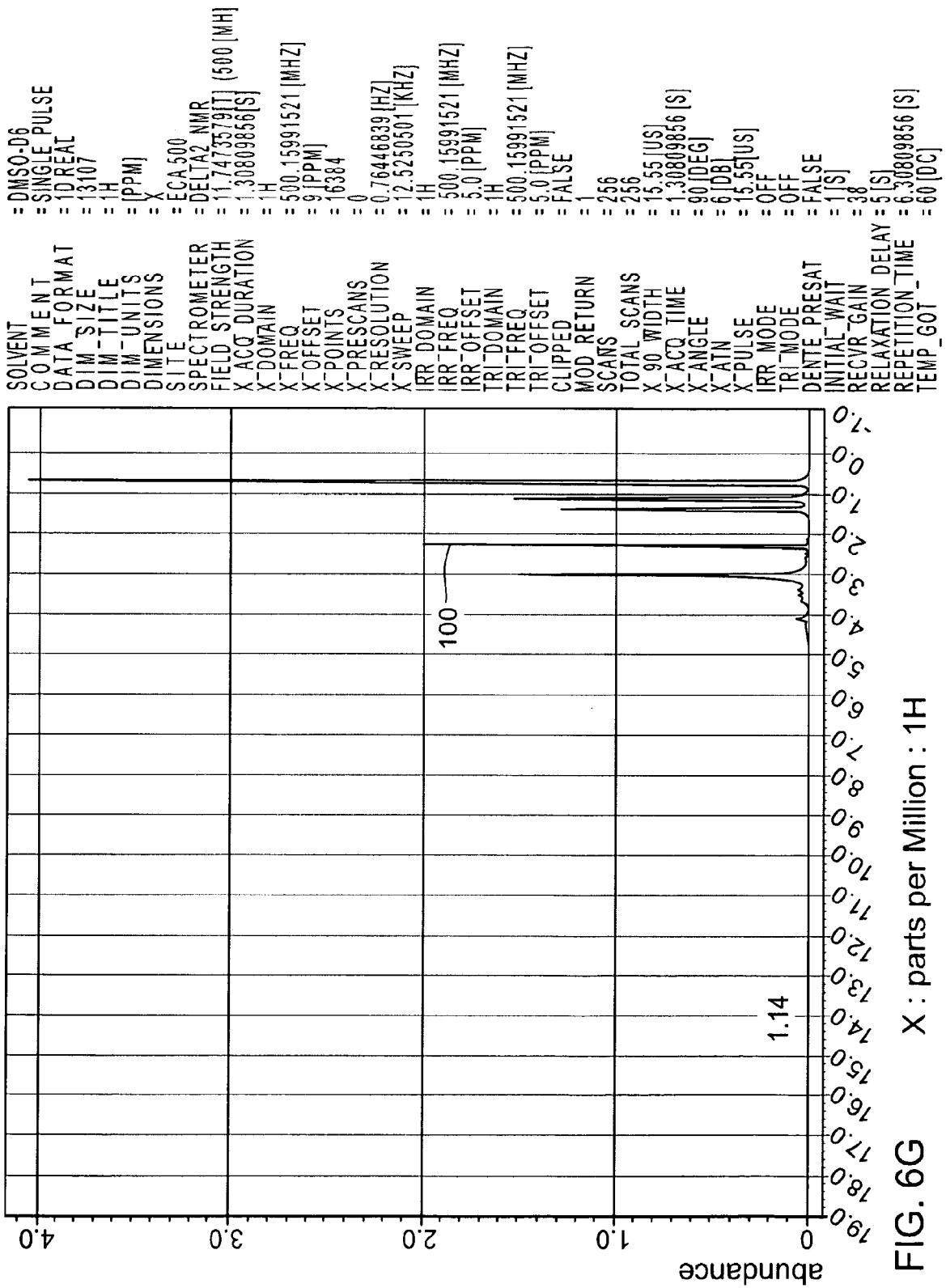
Figure 6H:
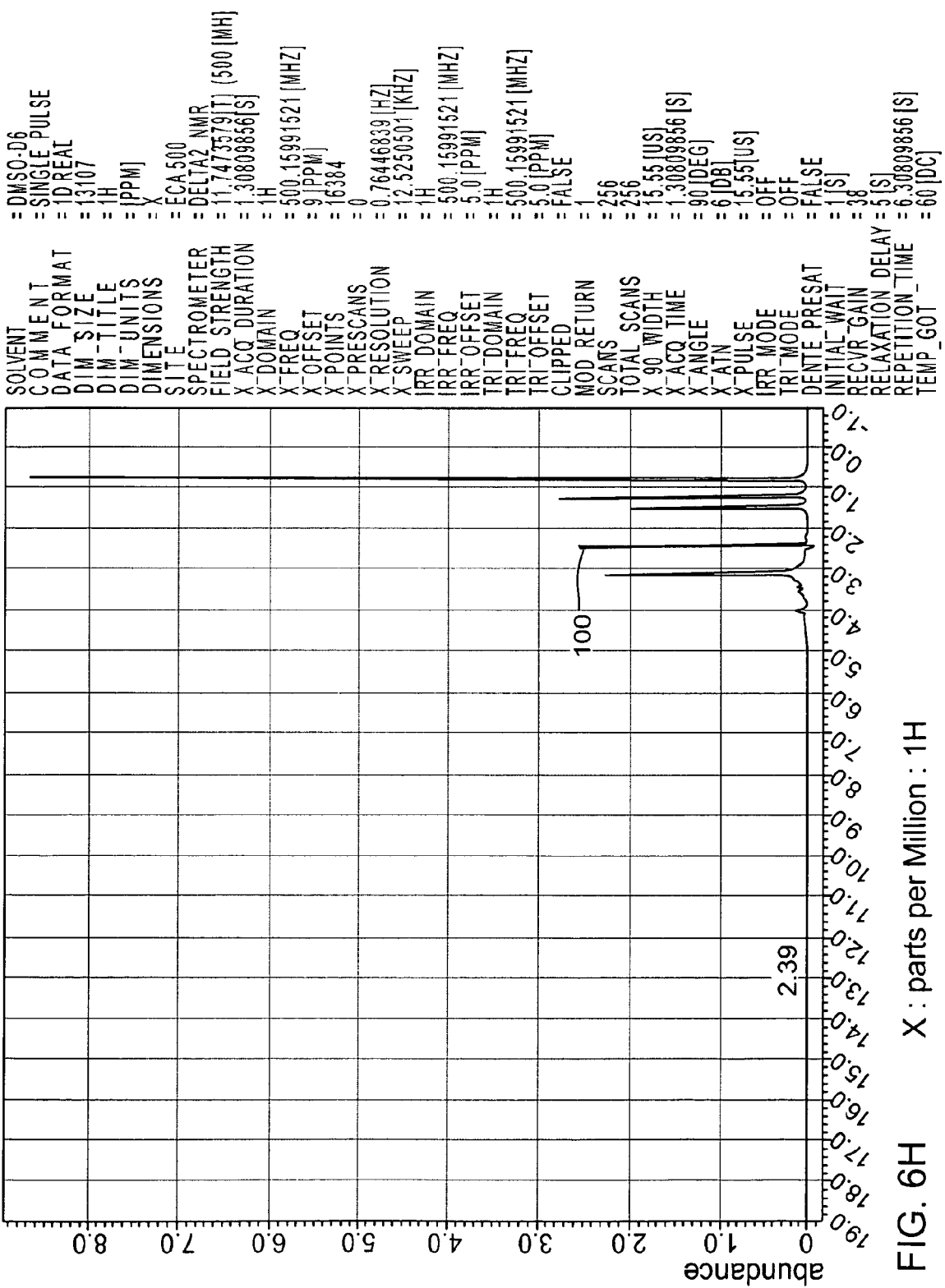
Figure 6I:
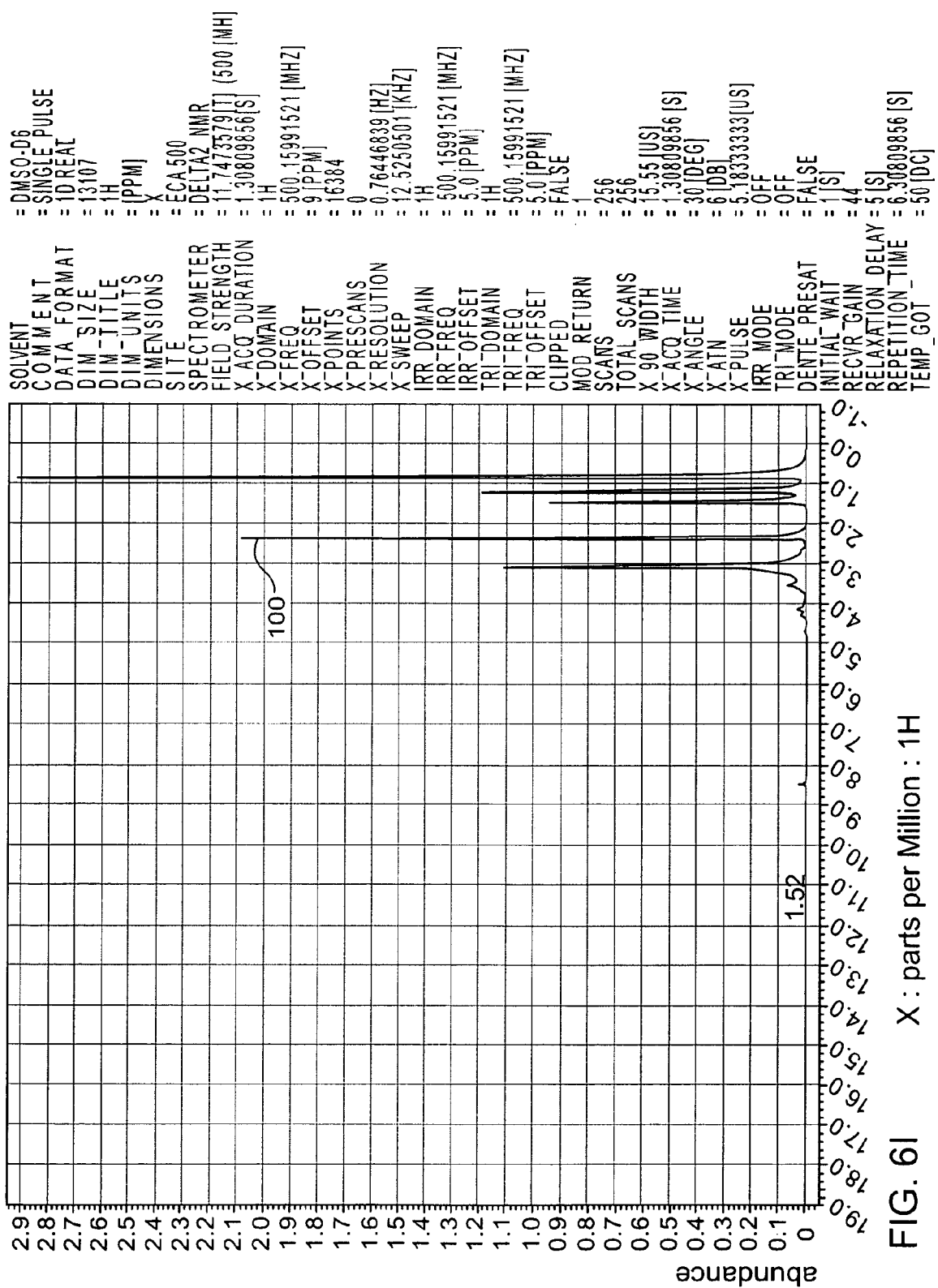
Figure 6J:
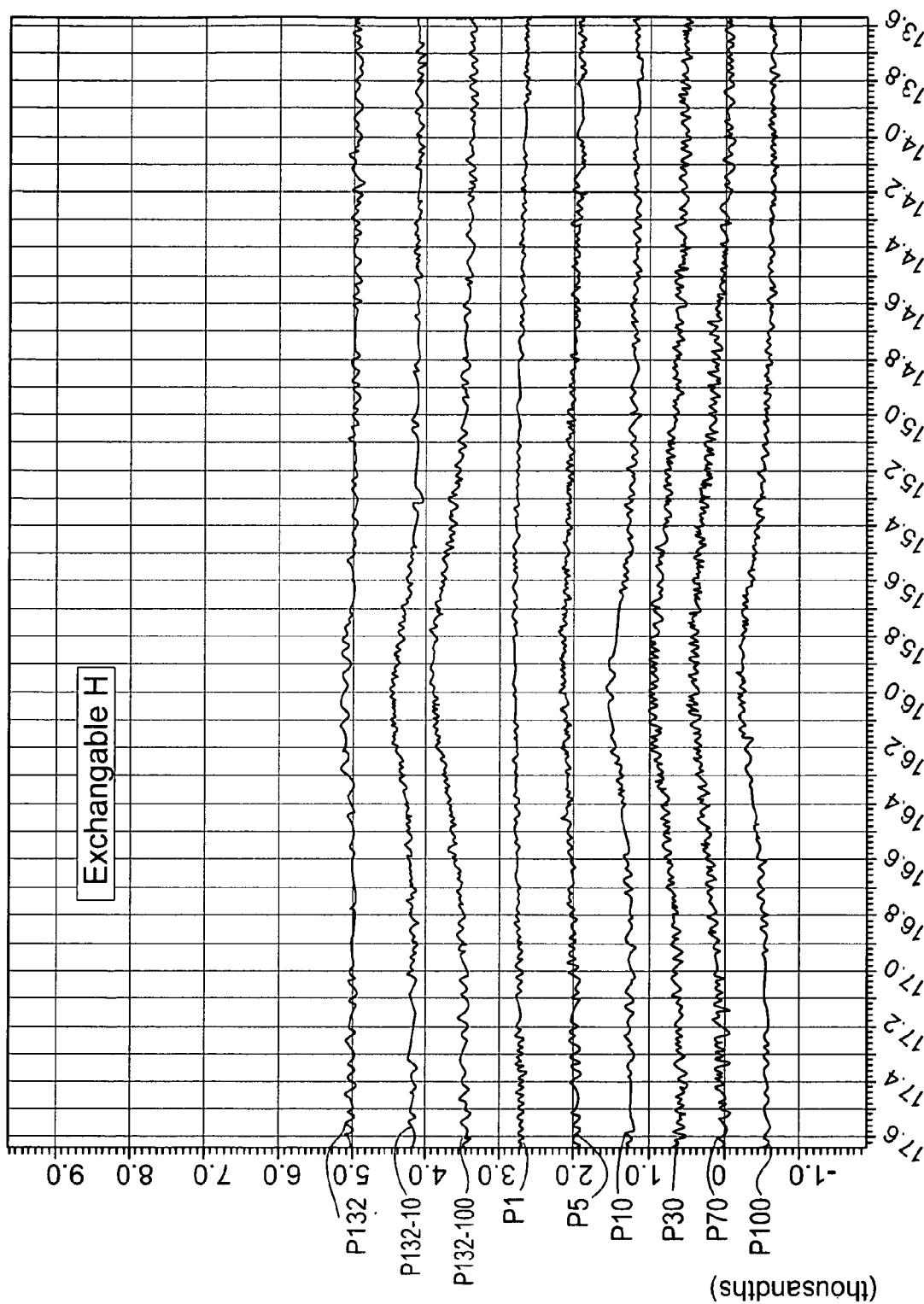
FIG. 6J is a comparison of the exchangeable proton at ~16 ppm from FIGS. 6A-6I.

FIG. 5 is an infrared spectrum of Kraft board paper sheared according to Example 4, while FIG. 6 is an infrared spectrum of the Kraft paper of FIG. 5 after irradiation with 100 Mrad of gamma radiation. The irradiated sample shows an additional peak in region A (centered about 1730 cm$^{-1}$) that is not found in the un-irradiated material. Of note, an increase in the amount of a carbonyl absorption at ~1650 cm$^{-1}$ was detected when going from P132 to P132-10 to P132-100. Similar results were observed for the samples P-1e, P-5e, P-10e, P-30e, P-70e, and P-100e.

Example 4

Proton and Carbon-13 Nuclear Magnetic Resonance ($^1$H-NMR and $^{13}$C-NMR) Spectra of Irradiated and Unirradiated Kraft Paper Sample Preparation The samples P132, P132-10, P132-100, P-1e, P-5e, P-10e, P-30e, P-70e, and P-100e were prepared for analysis by dissolution with DMSO-d$_6$ with 2% tetrabutyl ammonium fluoride trihydrate. The samples that had undergone lower levels of irradiation were significantly less soluble than the samples with higher irradiation. Unirradiated samples formed a gel in this solvent mixture, but heating to 60° C. resolved the peaks in the NMR spectra. The samples having undergone higher levels of irradiation were soluble at a concentration of 10% wt/wt.

Analysis $^1$H-NMR spectra of the samples at 15 mg/mL showed a distinct very broad resonance peak centered at 16 ppm (FIGS. 6A-6J). This peak is characteristic of an exchangeable —OH proton for an enol and was confirmed by a "D$_2$O shake." Model compounds (acetylacetone, glucuronic acid, and ketogulonic acid) were analyzed and made a convincing case that this peak was indeed an exchangeable enol proton. This proposed enol peak was very sensitive to concentration effects, and we were unable to conclude whether this resonance was due to an enol or possibly a carboxylic acid.

Figure 6K:
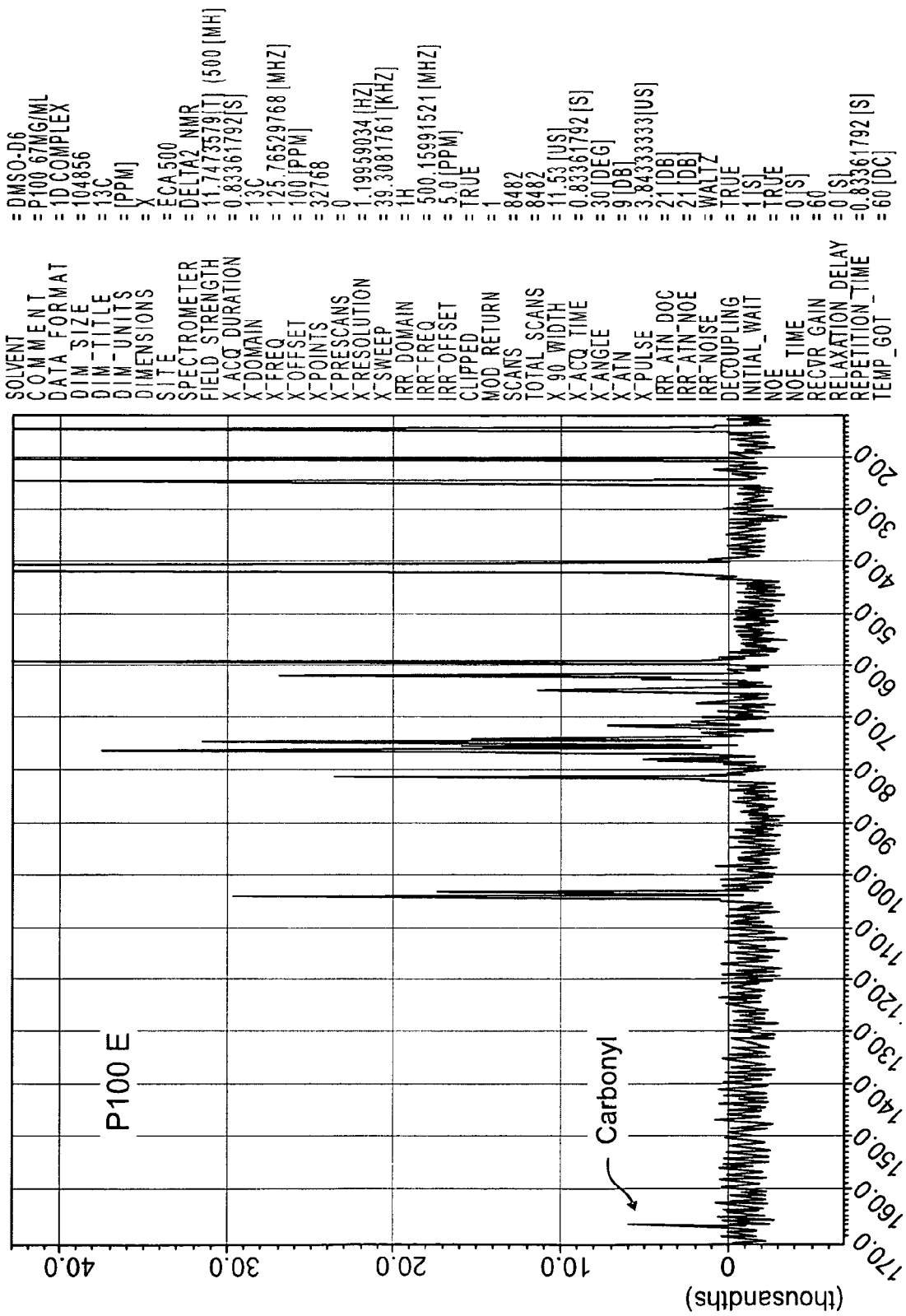
FIG. 6K is a $^{13}$C-NMR of sample P-100e.
Figure 6L:
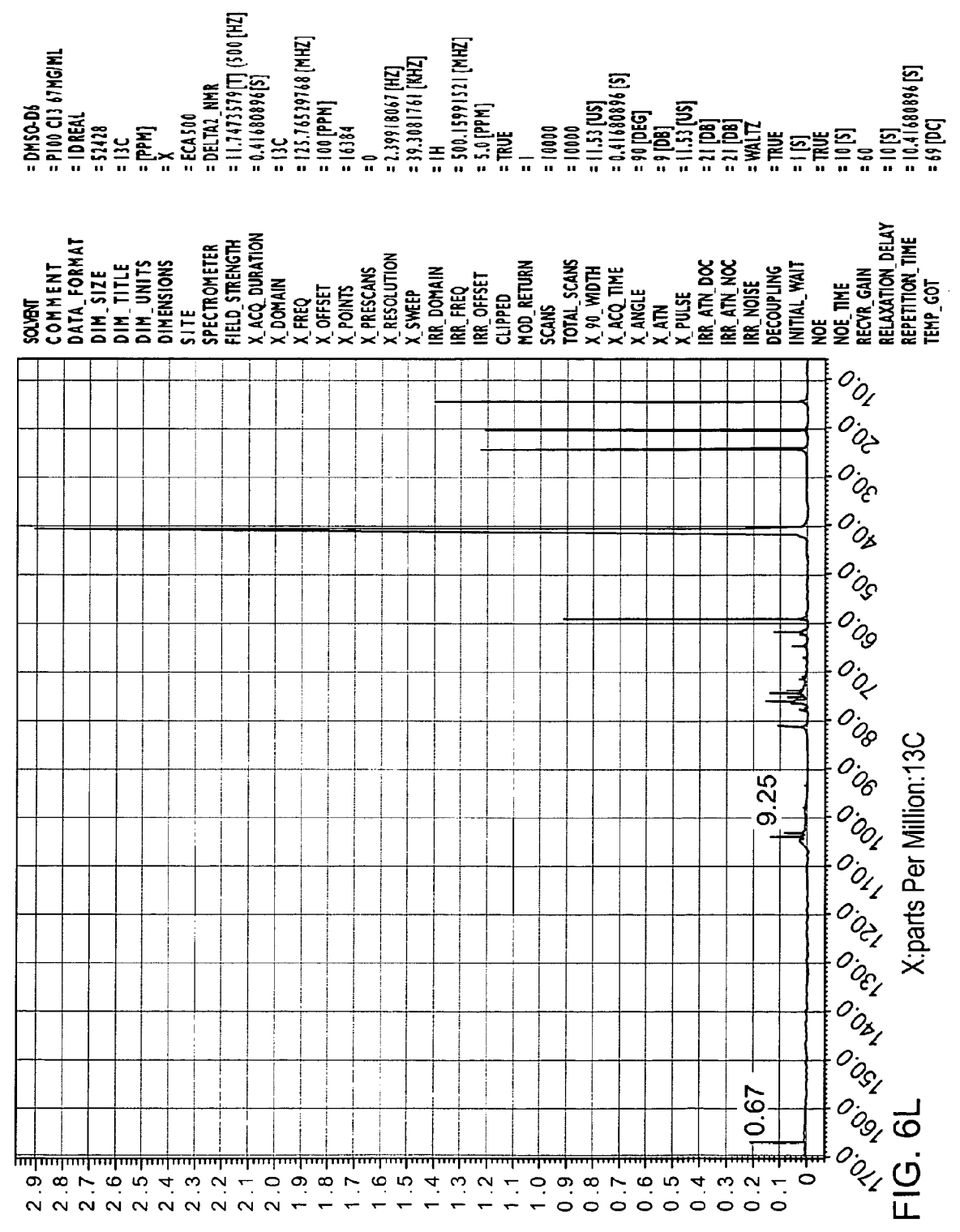
Figure 6M:
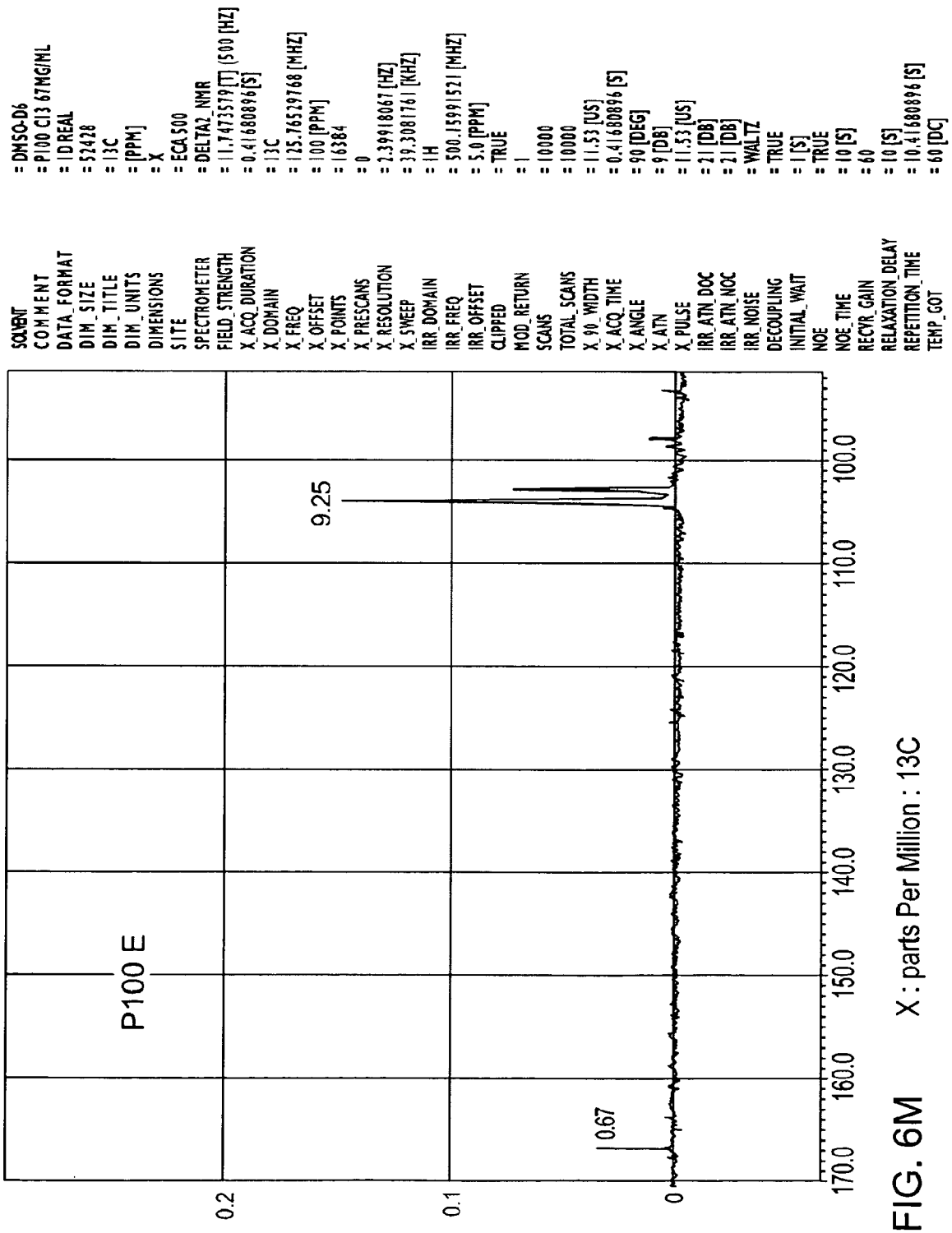
Figure 6N:
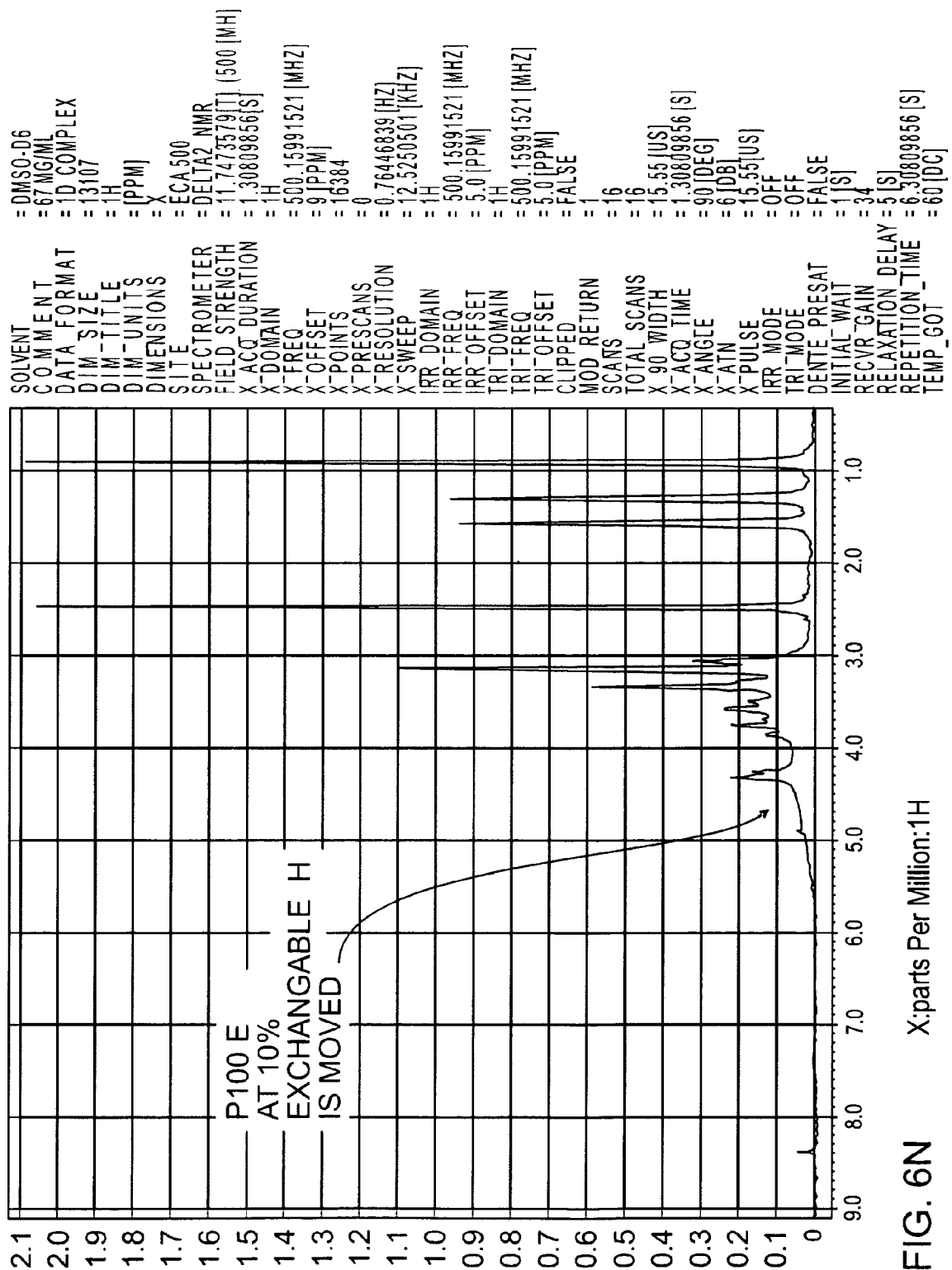
FIG. 6N is a $^1$H-NMR at a concentration of 10% wt./wt. of sample P-100e.

The carboxylic acid proton resonances of the model compounds were similar to what was observed for the treated cellulose samples. These model compounds were shifted up field to ~5-6 ppm. Preparation of P-100e at higher concentrations (~10% wt/wt) led to the dramatic down field shifting to where the carboxylic acid resonances of the model compounds were found (~6 ppm) (FIG. 6N). These results lead to the conclusion that this resonance is unreliable for characterizing this functional group, however the data suggests that the number of exchangeable hydrogens increases with increasing irradiation of the sample. Also, no vinyl protons were detected.

The $^{13}$C NMR spectra of the samples confirm the presence of a carbonyl of a carboxylic acid or a carboxylic acid derivative. This new peak (at 168 ppm) is not present in the untreated samples (FIG. 6K). A $^{13}$C NMR spectrum with a long delay allowed the quantitation of the signal for P-100e (FIGS. 6L-6M). Comparison of the integration of the carbonyl resonance to the resonances at approximately 100 ppm (the C1 signals) suggests that the ratio of the carbonyl carbon to C1 is 1:13.8 or roughly 1 carbonyl for every 14 glucose units. The chemical shift at 100 ppm correlates well with glucuronic acid.

Titration

Samples P-100e and P132-100 (1 g) were suspended in deionized water (25 mL). The indicator alizarin yellow was added to each sample with stirring. P-100e was more difficult to wet. Both samples were titrated with a solution of 0.2M NaOH. The end point was very subtle and was confirmed by using pH paper. The starting pH of the samples was ~4 for both samples. P132-100 required 0.4 milliequivalents of hydroxide, which gives a molecular weight for the carboxylic acid of 2500 amu. If 180 amu is used for a monomer, this suggests there is one carboxylic acid group for 13.9 monomer units. Likewise, P-100e required 3.2 milliequivalents of hydroxide, which calculates to be one carboxylic acid group for every 17.4 monomer units.

CONCLUSIONS

The C-6 carbon of cellulose appears to be oxidized to the carboxylic acid (a glucuronic acid derivative) in this oxidation is surprisingly specific. This oxidation is in agreement with the IR band that grows with irradiation at ~1740 cm$^{-1}$, which corresponds to an aliphatic carboxylic acid. The titration results are in agreement with the quantitative $^{13}$C NMR. The increased solubility of the sample with the higher levels of irradiation correlates well with the increasing number of carboxylic acid protons. A proposed mechanism for the degradation of "C-6 oxidized cellulose" is provided below in Scheme 1.

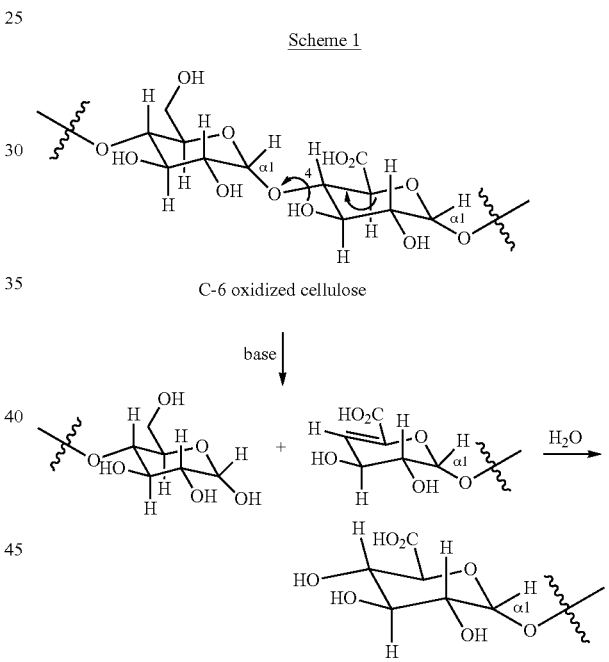

Scheme 1

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A method comprising:
   irradiating a lignocellulosic or cellulosic material in air with multiple doses of irradiation, to achieve a total dosage of from about 10 Mrad to about 100 Mrad of radiation, each dose being delivered at a dose rate of at least 0.5 Mrad/second using an electron beam operating in continuous wave mode, to generate carboxylic acid groups by reaction of the irradiated feedstock with the air and thereby provide an irradiated lignocellulosic or cellulosic material having a larger number of carboxylic acid groups than the cellulosic or lignocellulosic material from which the irradiated material was obtained.

2. The method of claim 1 wherein the treated material further comprises functional groups selected from the group consisting of aldehyde groups, nitroso groups, nitrile groups, nitro groups, ketone groups, amino groups, alkyl amino groups, alkyl groups, chloroalkyl groups, chlorofluoroalkyl groups, and enol groups.

3. The method of claim 1 wherein the cellulosic or lignocellulosic material is selected from the group consisting of wood, paper, and textile fibers.

4. The method of claim 1 wherein the lignocellulosic or cellulosic material comprises a fibrous material.

5. The method of claim 1 comprising a plurality of saccharide units arranged in a molecular chain, wherein from about 1 out of every 2 to about 1 out of every 250 saccharide units comprises a carboxylic acid group, or an ester or salt thereof, wherein the number of carboxylic acid groups is determined by titration.

6. The method of claim 5, wherein the material includes a plurality of said molecular chains.

7. The method of claim 6, wherein each chain comprises hemicellulose or cellulose.

8. The method of claim 6, wherein from about 1 out of every 10 to about 1 out of every 1000 saccharide units of each chain comprises a nitroso, nitro, or nitrile group.

9. The method of claim 6, wherein from about 1 out of every 35 to about 1 out of every 750 saccharide units of each chain comprises a nitroso, nitro, or nitrile group.

10. The method of claim 5, wherein from about 1 out of every 5 to about 1 out of every 250 saccharide units of each chain comprises a carboxylic acid group, or an ester or salt thereof.

11. The method of claim 5, wherein from about 1 out of every 8 to about 1 out of every 100 saccharide units of each chain comprises a carboxylic acid group, or an ester or salt thereof.

12. The method of claim 5, wherein from about 1 out of every 10 to about 1 out of every 50 saccharide units of each chain comprise a carboxylic acid group, or an ester or salt thereof.

13. The method of claim 5, wherein the saccharide units comprise 5 or 6 carbon saccharide units.

14. The method of claim 5, wherein each chain has between about 10 and about 200 saccharide units.

15. The method of claim 5, wherein the average molecular weight of the material relative to PEG standards is from about 1,000 to about 1,000,000, wherein the molecular weight is determined using GPC, utilizing a saturated solution (8.4% by weight) of lithium chloride (LiCl) in dimethyl acetamide (DMAc) as the mobile phase.

16. The method of claim 5, wherein from about 1 out of every 5 to about 1 out of every 1500 saccharide units comprises a nitroso, nitro, or nitrile group.

17. The method of claim 5, wherein the irradiated material comprises a mixture of nitrile groups and carboxylic acid groups.

18. The method of claim 1, wherein the material is irradiated with about 25 Mrad to about 75 Mrad of radiation.

19. The method of claim 1, wherein the energy of each electron of the electron beam is from about 0.25 MeV to about 7.5 MeV.

20. The method of claim 1 wherein the electron beam has a power of at least 20 kW.

21. The method of claim 1 wherein the electron beam has a power of at least 50 kW.

22. The method of claim 1 wherein the electron beam has a power of at least 100 kW.

* * * * *